INVENTOR.
DAVID H. LOCKLIN
BY
ATTORNEYS

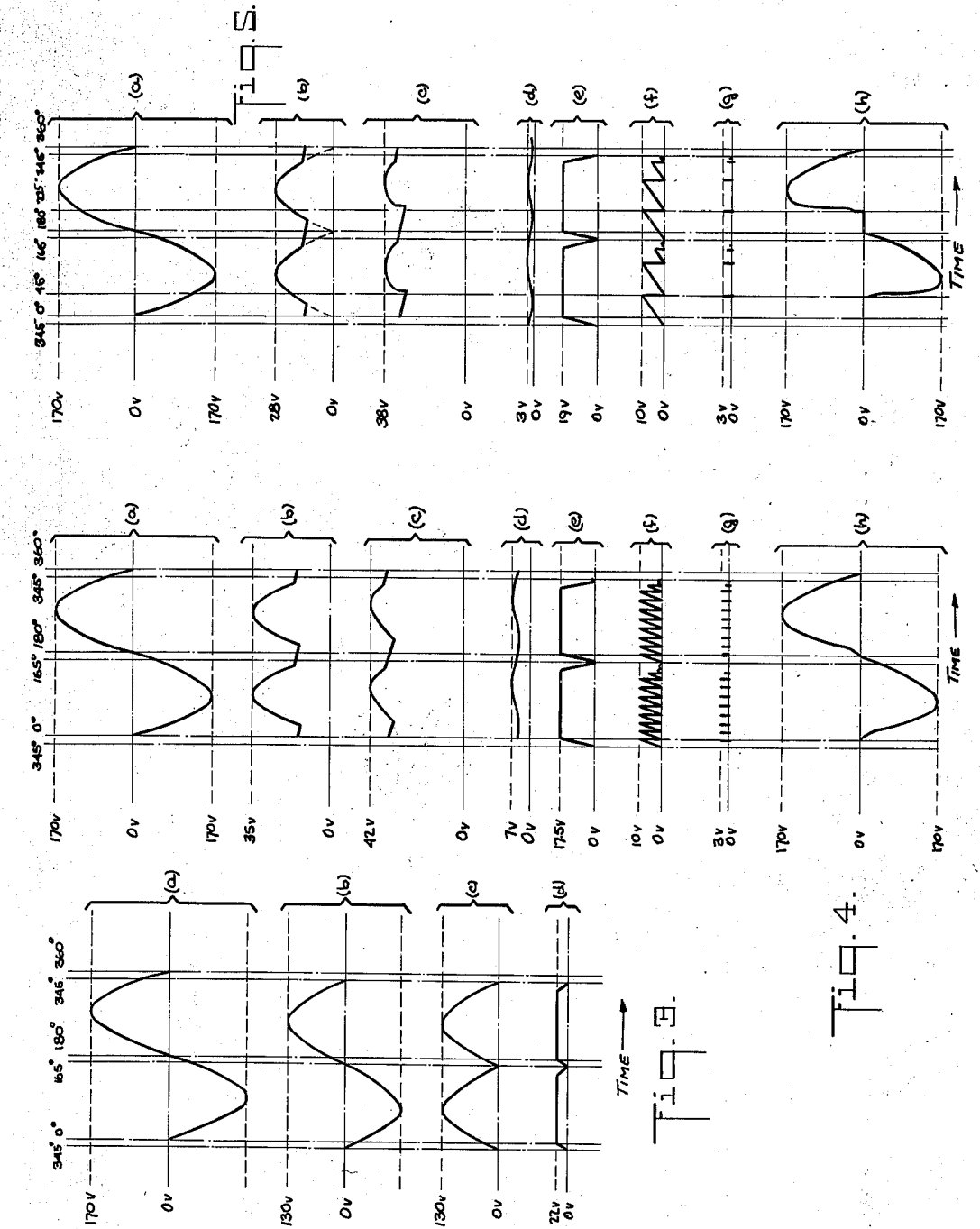

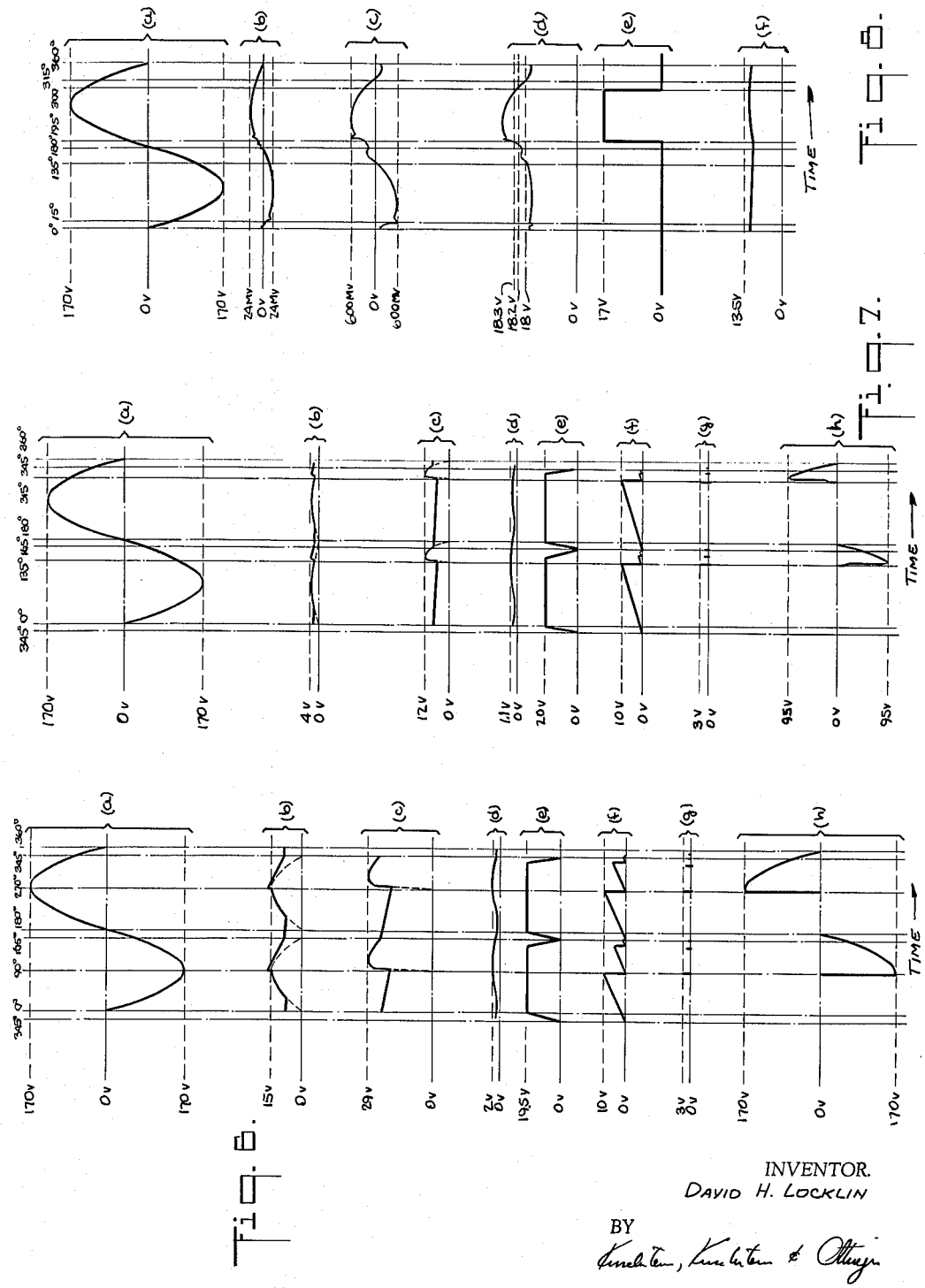

United States Patent Office 3,243,653
Patented Mar. 29, 1966

3,243,653
CONTROL CIRCUIT FOR AN A.C. POWER UNIT
David H. Locklin, New Haven, Conn., assignor to Century Lighting, Inc., a corporation of New York
Filed Feb. 8, 1963, Ser. No. 257,219
15 Claims. (Cl. 315—194)

This invention relates to an A.C. power unit, and, more particularly, is concerned with a power unit regulated by a lighting intensity control circuit for varying, that is to say, dimming, at will the intensity of electric lighting, the unit having its preferred, although not only, use when feeding an incandescent lamp load. Such power units are of a type which are most generally used, for, although not limited to, theatre and television lighting. My present invention is concerned with an improvement over current commercial light dimming A.C. power units of the type which use silicon controlled rectifiers and which heretofore have made this type of rectifiers imperfectly adapted for use in a light dimming A.C. power unit.

For example, some equipment utilizing silicon controlled rectifiers is large and heavy and requires considerable space and large casings to support and house inductive devices that had to be utilized for the purpose of limiting cold incandescent lamp in-rush currents which would otherwise destroy silicon controlled rectifiers in a fraction of a second. On the other extreme, due to the losses incurred from such necessarily employed inductive devices it has been customary to include in the aforesaid power units booster transformers in order to have the maximum output voltages approach normal line voltage. But the employment of the booster transformers along with the inductive devices substantially increased the total weight and the overall bulk, i.e., physical size, of the power units and their components as well as the power lost in such units.

Another difficulty experienced with other types of prior art power units including silicon controlled rectifiers was the basic inability of said rectifiers to accommodate cold incandescent lamp in-rush peak currents and overloads. Incandescent light dimming A.C. power units which have, up to the present time, been able to handle in-rush currents and overloads, have been subject to other undesirable characteristics that limited their performance, particularly in their application to television and theatre lighting which is one of their principal uses. For instance, current limiting reactors and other high reactance means have been used to limit the first half cycle peak current surge to values within the short term load capacity of the silicon controlled rectifiers employed which, as is well known, is only somewhat greater than the maximum load capacity of the silicon controlled rectifiers. Such power units, upon sensing this surge, phased back the output of the dimmer to a point that limited the heating content of the current to recurrent values that were safe. Depending upon the particular circuit design of the power unit this expedient more or less seriously limited the illumination performance of such unit in theatre and television applications. If the light dimming power unit was designed to accommodate overloads of any magnitude it had to be a constant current output device. Therefore the turn-on time constant of the voltage output (the time required to warm up the incandescent filaments to their proper operating temperatures) varied with the size (power rating) of the incandescent lamp load that was attached at any instant. However, in theatre and television applications the attached incandescent lamp load may vary from moment to moment from a small fraction of the maximum capacity to the rated maximum capacity of the light dimming A.C. power unit. Accordingly the constant current power units when operated in multiple with a wide variety of loads attached to individual units and simultaneously turned on to render the same effective with a single step of control voltage reached their respective maximum outputs in varying periods of time. This produced an unrealistic and sometimes eerie effect. Depending upon the particular power units used, this period may, at maximum load, last as long as 60 cycles, that is to say a full second, so that different attached loads would reach their scheduled, i.e., prearranged, peaks at periods of time varying from a few milliseconds up to a full second. Still further, if a constant current dimmer power unit were designed to maintain a constant current value at some value which was greater than its desired maximum, this being done in order to reduce its turn-on time constant, its ability to detect overloads would be lost, thus making it possible to destroy the silicon controlled rectifiers due to the excessive power that would be allowed to be dissipated therein.

The only other kind of protective means available in the prior art were circuit breakers and fuses. However, standard panel board circuit breakers and fuses are ill-suited to semiconductors due to their long operate times which are so protracted that semiconductors could fail due to their excessive junction heating, inasmuch as semiconductors are inherently unable to withstand high junction temperatures for even slightly extended periods. In order to more fully protect semiconductors during high magnitude faults a special semiconductor fuse often is employed. This fuse uses two massive blocks of copper or the like as heat sinks between which one or a few carefully designed and manufactured silver links are bridged that will melt in micro-seconds at predetermined current levels low enough to protect the semiconductors. Such semiconductor fuses are fairly effective up to 0.25 second in providing coordinated overcurrent protection; however their effectiveness beyond a quarter of a second is limited, being dependent upon such sundry factors as the ambient temperature and the ability of the heat sink massive copper blocks to hold the temperature of the silver link or links below its or their critical melt point.

In order to provide complete protection against minor faults, and particularly against minor faults which the special semiconductor fuse cannot handle, it has been proposed to place in series with the special semiconductor fuse a fast acting (so-called "instantaneous trip") circuit breaker. Such a circuit breaker has a current versus time characteristic that is coordinated with the overload capabilities of the silicon controlled rectifier after a period of 0.25 second. For periods of time less than 0.25 second a fast acting circuit breaker does not have the ability to absorb short duration faults (overloads) such as are created by the in-rush current of cold incandescent lamp filaments, despite the fact that the silicon controlled rectifiers and the special semiconductor fuse could absorb such faults. In other words for such conditions, although the semiconductors might not require the protection, the instantaneous trip type of circuit breaker would open. Therefore additional provisions must be made to keep such circuit breakers from tripping. Quite often this is achieved with the aid of the aforementioned load sensitive phase back circuit which, however, is subject to the defects above described. Moreover instantaneous trip circuit breakers operate erratically at marginal overloads due to the mechanical nature of these devices so that it is usual to require substantial safety factors to be used in the selection of the silicon controlled rectifiers for the light dimming A.C. power unit. This means that overrated silicon controlled rectifiers, and therefore more expensive silicon controlled rectifiers, must be purchased.

Furthermore constant current light dimming power units which will phase back if overloaded present an undue safety hazard. When inserted in series with power lines these units are unable to discriminate between normal incandescent cold lamp in-rush currents, overloads and minor faults; and minor faults might be of a nature which unless detected could produce undue heating with consequent risk of fire.

It is the principal object of my invention to provide a light dimming A.C. power unit which avoids all of the foregoing drawbacks.

It is another object of my invention to provide a light dimming A.C. power unit which is extremely efficient and in which there is no need for boosters to make up for voltage lost during passage through the unit.

It is another object of my invention to provide a light dimming A.C. power unit which uses to full advantage the capacity, ruggedness, compactness and low weight afforded by solid state components.

It is another object of my invention to provide a light dimming A.C. power unit in which the number, size, cost and weight of the associated inductive devices are greatly reduced, thus substantially lowering the noise created thereby, the space required and the expense of the unit.

It is another object of my invention to provide a light dimming A.C. power unit of such character and design and which is so constructed that the components thereof rarely need replacement.

It is another object of my invention to provide in a light dimming A.C. power unit an overcurrent protection means which will fully guard the associated power wiring against faults of any magnitude beyond specified normal loading.

It is another object of my invention to provide in a light dimming A.C. power unit an overcurrent trip means which will turn the power unit off upon applications of minor overloads in excess of the specified maximum (usually about 120%) in 0.25 second or less and which also will signal the operator that such an overload has occurred.

It is another object of my invention to provide in a light dimming A.C. power unit a remotely located means for resetting the unit after it has been turned off upon the occurrence of a power overload, which means will maintain the unit turned off after the power overload has been removed and until said means has been purposely reset.

It is another object of my invention to provide in a light dimming A.C. power unit an overcurrent trip means which will not trip out during the presence of momentary overloads such as might be caused by the cold in-rush current for incandescent lamp filaments and can be absorbed by the design of the semiconductor power handling components.

It is another object of my invention to provide a light dimming A.C. power unit which will trip under thermal overload such as might be caused by high ambient temperatures.

It is another object of my invention to provide a light dimming A.C. power unit which will provide a remote signal to indicate a thermal overload condition.

It is another object of my invention to provide a light dimming A.C. power unit which will reset itself automatically after a thermal overload has been removed.

It is another object of my invention to provide a light dimming A.C. power unit which may be adjusted to provide any one of a number of output voltage levels for given signal input levels.

It is another object of my invention to provide a light dimming A.C. power unit which has a one way time constant, that is to say, a unit in which the turn-on voltage time constant corresponding to a stepup in control voltage or current is substantially greater, for instance five to one, than the turn-off voltage time constant for a stepdown of the same or approximately the same value of control voltage or current, thereby supplying a unit which will reduce needless semiconductor fatigue, has desirable incandescent lamp "switching" characteristics, and lends itself readily to "cold patch" load attachment systems.

It is another object of my invention to provide a light dimming A.C. power unit in which the turn-on voltage time constant is insensitive to the magnitude of the attached load without however sacrificing the protection required for the power semiconductors.

It is another object of my invention to provide a light dimming A.C. power unit which utilizes the surge capacities versus the average capacities of silicon controlled rectifiers to their greatest possible advantage, thus substantially lowering the cost of a high surge capacity unit.

It is another object of my invention to provide a light dimming A.C. power unit which has an increased output conduction angle (which angle may even reach 180°) over previous units using solid state line synchronized relaxation oscillators or other types of phase shift means.

It is another object of my invention to provide a light dimming A.C. power unit which will not misfire during the transitive periods of energization and de-energization of the unit thus avoiding needless power semiconductor stress.

It is another object of my invention to provide a light dimming A.C. power unit which is amenable to present day practice and designs for providing remote station generated intensity control signals and which can be regulated by signals of either A.C. or D.C. character or by half wave or full wave D.C. rectified signals of any phase displacement with respect to the input power line.

It is another object of my invention to provide in a light dimming A.C. power unit a small constant leading phase angle voltage shift for supply to a firing circuit so that where full conduction or near full conduction is required the firing circuit will be prepared to trigger the controlled rectifier or rectifiers immediately upon the commencement of a fresh half cycle of line voltage.

It is another object of my invention to provide in a light dimming A.C. power unit a current sensitive locked-on shorting device for disarming the firing circuit of a controlled rectifier whereby the firing circuit will remain disarmed until manually reset.

It is another object of my invention to provide in a light dimming A.C. power unit a current sensitive locked-on shorting device for disarming the firing circuit of a controlled rectifier which device includes a component, such for instance as a capacitor, to absorb the inrush current of a cold incandescent lamp load whereby to prevent premature shorting.

It is another object of my invention to provide in a light dimming A.C. power unit a current sensitive locked-on shorting device for disarming the firing circuit of a controlled rectifier which device includes an inductive component to store energy so that the device is sensitive to high current even at less than a full conduction angle.

It is another object of my invention to provide in a light dimming A.C. power unit a filter circuit feedback from the power output to the signal input which filter has at least one component of variable impedance in order to change, if desired, the curve of current output and voltage versus the control signal input.

It is another object of my invention to provide in a light dimming A.C. power unit a capacitor or the like for delaying the reaction of the firing circuit to an increase in input signal, said capacitor being inserted between a variable resistance controlled by the signal and a phase shiftable pulse generator actuated by such signal.

It is another object of my invention to provide in a light dimming A.C. power unit a snubbing circuit in shunt with the controlled rectifier in order to slow fast rising line voltages such as often occur in power lines.

It is another object of my invention to provide in a light dimming A.C. power unit a reactor in series with the controlled rectifier to limit the rate of current rise during the breakdown period of the rectifier by providing a high impedance at this time and thereafter to reduce the rate of current and voltage rise and thus limit the shock of fast rising current that otherwise would cause audible lamp filament noise or create objectionable harmonics at radio frequency that might interfere with television and radio broadcasting or short range portable wireless transmission.

Other objects of my invention in part will be obvious and in part will be pointed out hereinafter.

My invention accordingly consists in the features of construction, combinations of elements and arrangements of parts which will be exemplified in the power unit hereinafter described and of which the scope of application will be indicated in the appended claims.

In the accompanying drawings, in which I have shown various possible embodiments of my invention, FIG. 1 is an electric diagram of a light dimming A.C. power unit embodying my invention;

FIG. 2 is an auxiliary input circuit to adapt the unit of FIG. 1 for acceptance of an A.C. control signal;

FIGS. 3(a), 3(b), 3(c) and 3(d) are a series of curves showing the relationship over the time indicated between, respectivly, (a) the input (line) A.C. voltage, (b) the leading A.C. voltage (but not under overcurrent conditions) which supplies power to the firing circuit for the silicon controlled rectifiers, (c) the leading full wave rectified pulsating D.C. voltage fed to said firing circuit, and (d) the leading clipped full wave rectified D.C. voltage actually applied to said firing circuit;

FIGS. 4(a), 4(b), 4(c), 4(d), 4(e), 4(f), 4(g), and 4(h) are a series of curves showing the relationship at maximum (180°) conduction over the time indicated between, respectively, (a) the line A.C. voltage, (b) the input signal voltage, (c) the filtered feedback voltage, (d) the base to collector voltage applied to the transistor which is connected across the signal delay capacitor, (e) the voltage across one of the resistors of a set that act as a voltage divider for the transistor that controls the phase shiftable double-based diode pulse generator, (f) the saw tooth voltage output of the double-based diode pulse generator, (g) the pulse voltage output of the pulse transformer that is energized by the double-based diode pulse generator and (h) the voltage power output from my light dimming A.C. power unit;

FIGS. 5(a) through (h) are a series of curves similar to those of FIGS. 4(a) through (h) but showing the relationship over the time indicated between the different voltages at a 135° conduction angle;

FIGS. 6(a) through (h) are a series of curves similar to those of FIGS. 4(a) through (h) but showing the relationship over the time indicated between the different voltages at a 90° conduction angle;

FIG. 7(a) through (h) are a series of curves similar to those of FIGS. 4(a) through (h) but showing the relationship over the time indicated between the different voltages at a 45° conduction angle;

FIGS. 8(a), 8(b), 8(c), 8(d), 8(e), and 8(f) are a series of curves showing the relationship at full load and full voltage output between, respectively, (a) the line A.C. voltage, (b) the voltage developed across the current shunt resistor, (c) the output from the step-up transformer for the current level detector, (d) the voltage applied to the base of the input, i.e., first transistor of the Schmitt trigger output current level detector, (e) the square wave voltage output from the Schmitt trigger and (f) the base to emitter voltage applied to the double-based diode used to shunt the capacitor of the pulse generator under overcurrent conditions;

FIGS. 9(a) through (f) are a series of curves similar to those of FIGS. 8(a) through (f) but showing the relationship between the different voltages when an overcurrent condition prevails at a 90° conduction angle;

FIGS. 10(a) and (b) are a series of curves showing the relationship at a stepup in signal input voltage and a stepdown in signal input voltage between, respectively, (a) the emitter to collector voltage of the transistor which is connected across the signal delay capacitor and (b) the base to collector voltage of said transistor, these curves being illustrative of the large turnon output voltage time constant compared to the turnoff output voltage time constant; and FIG. 11 is a graph showing two relationships between the voltage power output and the voltage signal input, the latter being illustrated as ten equidistant points on a potentiometer acting as a voltage divider to supply such signal input, the difference between the two curves being obtained by adjusting the feedback potentiometer coupled to the signal input.

The following description of my invention relates only to an A.C. power unit of a complete lighting control circuit inasmuch as my invention is specific thereto. My invention does not relate to that portion of the lighting control circuit which constitutes the remote control intensity station that usually provides a variable electric characteristic voltage that is used as a signal to the A.C. power unit which responsive thereto creates a variable voltage from a line source of power and applies this variable voltage to an incandescent lamp load so as to create a variable intensity of illumination.

In my invention now to be described in detail a pair of input terminals indicate where the variable control voltage is to be applied. The A.C. power unit is placed in series with the incandescent lamps to be controlled thereby and is shown to have a power input terminal and a power output terminal. Furthermore a fifth terminal is illustrated which is a low current common return for the A.C. power unit and is related to the power circuit.

Referring now in detail to the drawings, and more particularly to FIG. 1, power input terminals 20, 22 are directly connected to an alternating single phase current supply line, e.g., a standard line having a 170 volt peak and a 120 volt R.M.S., the terminal 20 being connected to the high or "off ground" side of the power line and the terminal 22 being connected to the common, i.e., ground or return, side of the power line.

A firing circuit 24 is powered directly from the supply line 20, 22 through a one-to-one isolation transformer 26. The primary 28 of said transformer is fed from the input terminal 20 through a circuit breaker 30, such, for example, as a Heinemann XO 411 TS 50 amp. 250 VAC 60 cycle single phase circuit breaker, curve 1, included as a switch for code requirements, in series with a semiconductor protection fuse 32, for example, a Chase-Shawmut Co. Form 101 amp. trap; the latter being in series with a current shunt resistor 34 which in turn is in series with a control circuit fuse 36 that is connected to one input terminal of the primary winding 28. The other input terminal of the transformer primary 28 is connected directly to the common ground, i.e., return, terminal 22 through a common return bus 38.

The secondary 40 of the transformer 26 has one output terminal thereof connected to a phase shifting network 42 preferably of the R-C type which here is shown as composed of a resistor 44 shunted by a capacitor 46. The R-C network 42 provides a fixed amount of leading phase shift voltage to a full wave rectifying bridge 48, said R-C network having its output terminal connected to an A.C. input terminal 50 of said rectifying bridge. Good results are secured with a leading phase shift in the order of about 15°. However suitable results are obtained between about 10° to about 30° leading phase shift. The operation and function of the R-C network 42 will be explained hereinafter. The other output terminal of the secondary 40 of the isolation transformer 26 is connected to the other A.C. input terminal 52 of the phase shifted rectifying bridge 48. The D.C. output of this bridge appears at a positive terminal 54 and a negative terminal 56 and consists of a full wave pulsating D.C. voltage with its zero voltage point leading (by the amount of phase shift of the R-C network 42) the supply line zero degree voltage point as it appears between the terminals 20, 22.

The pulsating positive D.C. voltage appearing at the positive terminal 54 is connected to one terminal of a voltage dropping resistor 58 by a lead wire 60, 60a (the "a" suffix on a reference numeral is employed to indicate the distant second part of any physically long lead wire running to a remote station, the first part being denoted by the reference numeral without the suffix "a" and said two parts being separated in the circuit diagram by a break) in series with a normally closed manually operable "reset" pushbutton 62 located at a remote station 64 and further in series with a lead wire 66, 66a.

The negative D.C. voltage appearing at the terminal 56 of the full wave rectifying bridge 48 is connected directly to a D.C. common bus 68 for the firing circuit 24 and for all other portions of the control circuit. The other terminal of the voltage dropping resistor 58 is connected to a low voltage positive D.C. bus 70 for the firing circuit 24 and for certain other portions of the control circuit. The voltage between the positive bus 70 and the common negative bus 68 is pulsating D.C. which is clipped and regulated by the action of a Zener diode 72 connected between the two said buses. Because the ratio of the source (and output) voltage of the isolating transformer 26 and the breakdown voltage of the Zener diode 72 is about seven to one, the clipped portion of the pulsating D.C. voltage which remains approaches that of a square wave which has its zero point shifted by a fixed amount in a leading sense from the zero point of the line voltage, this shift being effected by the R-C network 42. Said pulsating D.C. voltage now is at a level that is compatible with transistor circuitry and is synchronized to the cyclic A.C. variations of the supply (power) line, although, of course, predeterminedly displaced in phase because of the R-C network 42.

The aforesaid low value pulsating D.C. voltage is used, among other things, to synchronize and drive the firing circuit 24 for the A.C. power unit which circuit, as shown, consists of a conventional double-based diode (commonly known as a Unijunction transistor) relaxation oscillator that functions as a pulse forming network and also as a phase shifting means, this latter function being effected by the displacement in time of the first pulse of the series of pulses created in any line half-cycle by said oscillator which said first pulse is applied to the gate (control) terminal of the A.C. power unit to fire the same. Specifically, said firing circuit is formed by a resistor 74, a double-based diode 76, a pulse transformer primary 78, a capacitor 80, a PNP transistor 82, a resistor 84, and a diode 86. The PNP transistor 82 is connected and employed to function as a variable, albeit nonlinear, resistor in series with the diode 86, the resistor 84 and the capacitor 80 across the two D.C. buses 68, 70.

It can be seen that, in the absence of a signal across the base to emitter junction of a PNP transistor 88, the emitter to base junction of the transistor 82 is reverse biased, thus causing said transistor 82, in such absence of a signal input, to present a very high emitter to collector resistance in series with the diode 86, the resistor 84 and the capacitor 80. However, if a signal input is applied and increased and if, accordingly, the emitter to base junction of the transistor 82 is progressively brought into forward bias, the emitter to collector resistance of said transistor 82 is lowered from a several megoms to several hundred ohms, thus affecting (in this instance, increasing) the charge rate on the capacitor 80. Thereby, depending upon the signal input and consequently upon the condition of the transistor 82, the charge rate of the capacitor 80 is increased or decreased. When a critically high voltage is developed on the capacitor 80, as established by the voltage between the D.C. negative and positive buses 68, 70, the value of the resistor 74, the impedance of the primary 78 of the pulse transformer 94 and the peak point voltage of the double-based diode 76, said double-based diode will develop a negative resistance condition. This allows the capacitor 80 to discharge through said double-based diode and, hence, through the pulse transformer primary 78. The positive pulse appearing on the output windings (secondaries) 90, 92 of the pulse transformer 94 are used to directly fire parallel connected matched silicon controlled rectifiers 96, 98 through lead wires 93, 95 (shown as broken in the circuit to avoid confusion) connected to the gate terminals of said silicon controlled rectifiers.

Due to the fact that the voltage which appears between the positive bus 70 and the D.C. common negative bus 68 is raw (unfiltered) pulsating D.C. and thus drops to zero once each half cycle, the inter-base voltage of the double-based diode 76 also drops to zero once each half cycle, thus causing the capacitor 80 to discharge once every half cycle. Such action synchronizes, i.e., causes to occur at the same frequency, but not at the same instant due to the phase shifting circuit 42, the initial charging point of the capacitor 80 with the supply line frequency. Thereby the conduction angle of the silicon controlled rectifiers 96, 98 is dependent upon the charge rate of the capacitor 80 from its point of synchronization until it first causes the double-based diode 76 to change into its negative resistance state each half cycle of the firing circuit. Subsequent changes of the double-based diode to its negative resistance state during the same half cycle as the first change does not affect the firing of the silicon controlled rectifiers since once they have fired they continue to conduct during the same half cycle, provided, of course, that sufficient current flows therein to maintain conduction.

It will be observed that the R-C network 42 advances by a small amount, i.e., from about 10° to about 30°, as applied to the firing circuit 24 the aforesaid synchronization point and energy available for pulse generation at supply line zero, thus providing at substantially supply line zero for an available firing pulse to the regulated silicon controlled rectifiers 96, 98 when a 180° conduction angle is required for maximum available (peak) output. Moreover, by this means minimum voltage losses in the power circuit may be achieved, thereby improving the efficiency of my lighting control circuit over that of conventional line synchronized relaxation oscillator circuits which can only approach zero degrees and thereby only approach a 180° conduction angle, due to the lack of available control energy when the supply line voltage approaches zero. Furthermore, due to the non-linear nature of the transistor 82, considerably less drive and feed-back compensation is required to achieve the same power output conduction angle from the regulated silicon controlled rectifiers, 96, 98.

The power section of my light dimming A.C. power unit consists of the circuit breaker 30, the semi-conductor protection (silver link) fuse 32, the current shunt 34, a saturating reactor filter 100, a full wave bridge 102 consisting of four power rectifiers (diodes) 104, 106, 108, and 110 connected in a full wave rectifying configuration (although not so used but rather used as a polarizing bridge), and the matched pair of silicon controlled rectifiers 96, 98. If desired, only a single silicon controlled rectifier may be used, although I prefer to employ two or more, that is to say plural, such rectifiers connected in parallel and functioning as a phase sensitive (conduction angle) control means inserted between the D.C. terminals 112, 114 of the full wave polarizing bridge 102.

The positive terminal 112 of said bridge is connected to the anodes of the silicon controlled rectifiers 96, 98 and the negative terminal 114 of said bridge is connected to the cathodes of said silicon controlled rectifiers. Moreover said negative terminal of the bridge is connected by a return lead wire 115 to both the other terminals of the pulse transformer secondaries 90, 92.

I wish to point out that the specific configuration of the aforesaid power section is not a critical feature of my invention inasmuch as my invention may be carried out in connection with power sections of other configurations, as, for example, two or more controlled rectifiers, e.g., silicon controlled rectifiers, or thyratrons, connected in a conventional back-to-back or inverse parallel configuration. However, the use of two silicon controlled rectifiers inserted in a full wave D.C. bridge enables me to take advantage of a feature that has not heretofore been fully appreciated in prior art light dimming A.C. power units.

Semiconductors and, in particular, silicon controlled rectifiers have a limited surge capacity for transient and intermittent overloading. Consequently, their capacity to absorb cold lamp incandescent filament in-rush currents is limited. Paradoxically, cold incandescent lamp filament in-rush current values decay at a rate which is so rapid that the first half cycle peak will produce the greatest junction temperatures in semiconductors while succeeding early half cycles, although still in excess of steady state values, are so reduced in magnitude that the transistor junction is cooling. Thereby a definite advantage is gained in using a full wave D.C. bridge with any given two silicon controlled rectifiers that in normal practice would be connected in an inverse parallel (head-to-tail) configuration, in that with the illustrated configuration the two silicon controlled rectifier junctions are polarized to jointly absorb the first half cycle surge.

Although the bridge power rectifiers 104, 106, 108 and 110 add components and consequent expense to the power section of my light dimming A.C. power unit they are, at least at the present time, less expensive and more capable of absorbing current in-rush than are silicon controlled rectifiers.

Furthermore, in the bridge configuration with the silicon controlled rectifiers connected between the D.C. terminals, as compared to the inverse parallel configuration, the power losses for any given silicon controlled rectifier ordinarily will be somewhat less than the usual form factor values would indicate, due to the non-linear power characteristics of the forward biased junction. This additionally results in a lower steady state junction temperature which consequently permits a greater junction temperature rise during transient overloading.

The saturating reactor filter 100 is inserted in series with the full wave D.C. power bridge 102 and its associated silicon controlled rectifiers 96, 98 for the purpose of limiting, during and immediately after the avalanche breakdown of the silicon controlled rectifiers, the rate of current rise in the input line 20 and an output line 116 that is connected to an incandescent lighting load.

Said saturating reactor consists of but a few turns of wire, sufficient to carry the load current, and is wound on a small core consisting of one-by-one interleaved E–I transformer steel. Since said saturating reactor is intended to saturate, it has an initial high impedance during the breakdown period of the silicon controlled rectifiers and thus limits the current level during this short period. After such initial period of saturation, however, the saturating reactor 100 still possesses considerable reluctance due to the soft hysteresis loop of the transformer steel, the small air gaps introduced in the interleaved stacking of the core and the configuration of the E–I stack. This reluctance further reduces the rate of voltage and current rise after the initial saturation period. For example, with as little as 15 turns of wire wound on a core with a one inch cross-section, a minimum voltage and current rise of one volt per microsecond and two amperes per microsecond may be obtained with a 10 kw. incandescent lamp load attached and a 170 volt peak line voltage impressed at the time of initial conduction. This rate of rise has proven sufficient to limit the shock of fast rising current in associated conductors which would otherwise cause audible lamp filament noise and objectionable harmonics at radio frequencies.

A saturating type reactor filter possesses a number of advantages over other filter means used in lighting intensity control circuits. For example, the reactor may be designed out of inexpensive E–I transformer iron with a small cross-section and few turns, with a consequent reduction in cost and weight. Many inductive filters used in the prior art have been of the air gap type which were designed not to saturate during normal load current levels. The prior filters possessed a number of disadvantages in that they required a great number of turns, often as high as 50 to 100 turns, and a large core cross-section, often as high as 2 square inches. This resulted in a filter of considerable size and weight. Furthermore these prior filters possessed an inductance which was greater when at designed load and less when the loads were less than designed loads. Consequently, for each lighting intensity circuit of a given load rating a proper filter would be required which would differ in its core cross-section and number of turns from a filter for another given load rating. This, in turn, increased stocking for various dimmer current sizes. Furthermore, the design of any prior filter for any given load size resulted in a compromise between its full load losses versus its ability to effectively filter when only partially loaded due to its loss of inductance at lowered current values. Also the prior filters contributed substantial power loss to the overall circuit since they were electrically connected in the circuit during the entire conduction cycle. Furthermore, due to the air gaps required to keep the prior filters from saturating, considerable leakage flux and stray magnetic fields were present, as well as considerable audible noise, with the non-saturating type filters.

My novel saturating type reactor filter eliminates the above disadvantages. For example, it is of interleaved construction and thereby limits stray magnetic fields and audible noise. Furthermore, since the filtering effect is dependent upon volt-amperes required to saturate the core, a lightly loaded filter will still provide effective filtering, thus eliminating a variety of filters for various dimmer current sizes, as well as providing effective filtering over a very wide loading for any given dimmer. Also, since the filter operates only during the current rise period, after which it saturates, it contributes little R.M.S. voltage drop to the power circuit, unlike the non-saturating types.

A capacitor 118 having one terminal connected through a lead wire 120 and a junction 122 to a junction 124 between the saturating reactor filter 100 and the current shunt resistor 34 and having its other terminal connected by a lead wire 126 to the common return bus 38, further dampens the high frequency components generated by the regulated silicon controlled rectifiers, thus increasing the efficacy of the filter network.

The input signal, which is a regulated voltage signal appearing at input terminals 128, 130 from the remote intensity control station (not shown) to my light dimming A.C. power unit, may be pure D.C. or full wave pulsating D.C. or half wave pulsating D.C. or even A.C.

If an A.C voltage signal is supplied, an auxiliary network 132 (see FIG. 2) is utilized which consists of an isolating input transformer 134 of any suitable turns ratio, e.g., one-to-one, and a diode 136 to convert the A.C. signal to half wave pulsating D.C. By the insertion of the input transformer 134 A.C. signals from series aiding remote signal station power supplies which allow for "fading, as described in United States Letters Patent No. Re. 23,575 dated November 11, 1952, may be used. The half wave rectification achieved by the diode 136 suffices for the D.C. signal requirements of my light dimming A.C. power unit. A.C. input control signals are applied to the input terminals 128A and 130A; and the output terminals 128B and 130B of the auxiliary network 132 are connected to the input terminals 128 and 130, respectively, of my light dimming A.C. power unit.

Current from the positive signal input terminal 128 flows through a load resistor 138 to the negative signal terminal 130. In shunt with the load resistor 138 is a network including a voltage dropping resistor 140 in series with a resistor 142 that is shunted by a capacitor 144. The resistor 142 is connected in series with some operator-selected portion of the resistance of a potentiometer 146.

The resistor 142 and the capacitor 144 provide a signal filter network for the voltage developed across the resistor 142 this latter resistor being connected between the base and collector of the PNP resistor 88. Said transistor 88, connected as an emitter follower, is reverse biased by the presence of a suitable signal level across the resistor 142, and, therefore, in the absence of an input signal is forward biased. In this forward bias state the transistor 88 shorts a signal delay capacitor 148 that is connected between its emitter and its collector.

Upon a stepped increase (increment) of voltage appearing across the resistor 142, the transistor 88 is reverse biased, thus increasing its emitter to collector resistance many fold. At this point the signal delay capacitor 148 starts an exponential charge, the rate of which is fixed by the size of said capacitor 148, the adjusted value of a variable resistor 150 and the voltage developed across a resistor 152 which in series with the resistor 150 shunts the capacitor 148. This action, in effect, "delays" the forward biasing of the transistor 82 from a "switch on action" to a progressive forward biasing over a number of milliseconds. Such action in turn affects the charging rate of the capacitor 80 which ultimately determines the firing angle of the matched silicon controlled rectifiers 96, 98. In other words, the signal delay capacitor 148 has the effect of providing first a lag and then a fixed rate of firing angle advance from off or zero degree conduction to full or 180° conduction over a successive number of applied half cycles to the regulated silicon controlled rectifiers. Accordingly, during the application of a step up in signal voltage from the remote control intensity station, cold lamp incandescent filament in-rush currents or other increase in currents are accommodated by means of a phase on delay which limits undue heating effects upon the power semiconductor components.

Particular attention is directed to the fact that this delay may, by adjustment of the component values, be "one way." In other words the turn-on output (power) voltage time constant as measured from a step-up of signal voltage across the input control signal terminals 128, 130 need not be the same as that of the turn-off time constant as measured from the removal of the same signal. In practice by the use of my circuit the turn-on time constant easily may be five times, or more, if desired, that of the turn-off time constant. This is due to the discharge path for the signal delay capacitor 148 which path is formed by the transistor 88 and is influenced by the parameters of the resistors 138, 140, 142, the potentiometer 146, a variable resistor 154 and the capacitors 144 and 156. Said resistor 154 and capacitor 156 are connected in series with one another and in parallel with the potentiometer 146. In a later portion of this specification I will demonstrate this feature of my circuit by reference to graphs which accompany this specification.

The aforesaid one way delay characteristic is of considerable advantage in theatre and television lighting where large wattage lamp filaments possess considerable after glow, even upon instantaneous removal of the voltage applied thereto. Consequently, after glow is prolonged by a long switch-off, i.e., turn-off, time constant that makes it difficult to achieve sudden switch-off effects usually referred to in the field as "blackouts." On the other hand a fast "switch-on" time constant is bad for the power semiconductors.

Furthermore, a fast turn-off time constant is essential in "cold patch" systems. This type of system as described, for instance, in United States Letters Patent No. 2,810,864, dated October 22, 1957, is often employed as a principal load attachment means inserted in series with the output of A.C. power units, as for example the terminal 116 of my novel light dimming A.C. power unit. This cold patch system in conjunction with the present unit reduces needless stress on the power semiconductor components of the present unit due to the lengthened turn-on time constant, and eliminates arcing of the load attachment jack and plug due to the dimmer being off. Said system achieves these ends by opening one of the signal wires with a microswitch while the load plug is being inserted or removed from the dimmer output jack. Since the time required to perform this operation is measured in milliseconds, the time-off constant must be extremely short to secure a proper operation.

My novel light dimming A.C. power unit as described up to this point is inherently non-linear in terms of a given amount of control signal versus the derived R.M.S. output voltage. To compensate for this non-linearity and to provide for adjustments that will allow for a wide variety of output voltages at different given input signal levels and, furthermore, to provide for any desired curve of output voltage regulation, I provide a voltage derived negative feedback loop.

Said feedback loop includes a feedback transformer 158 the primary of which has one terminal connected by a lead wire 160 to an output bus 162 at a junction 164. The other terminal of said primary is connected by a lead wire 166 to the ground return bus 38 at a junction 168. Thus the feedback transformer 158 monitors the A.C. output power voltage and with the aid of diodes 170, 172 and a center tap 174 on the secondary 176 of the feedback transformer 158 rectifies the derived feedback voltage into a full wave D.C. voltage.

Said pulsating D.C. feedback voltage is filtered by the variable resistor 154 and the capacitor 156. The degree of filtering is determined by the operator's setting of the resistor 154. The feedback voltage is applied across the R-C filter circuit (154, 156) and across the potentiometer 146, the negative side of the feedback voltage which is developed at the filter tap 174 being connected to the negative signal input terminal 130. The derived negative feedback voltage developed across the potentiometer 146 thus will be a D.C. voltage with a ripple content and will offer varying degrees of opposition to the impressed signal voltage appearing between the adjustable tap of the potentiometer 146 and the negative signal input terminal 130. Depending upon the amount of filtering provided by the capacitor 156, the magnitude of the feedback voltage as determined by the adjustment of the variable resistor 154 and the amount of feedback that is utilized as determined by the adjustment of the potentiometer 146, the instantaneous feedback voltage will modify the instantaneous signal input voltage and in turn will modify the voltage across the base to collector junction of the transistor 88. In turn as explained herein this will affect the conduction angle of the regulated pair of matched silicon controlled rectifiers 96, 98.

The adjustment of the potentiometer 146, the amount of feedback seen in the signal circuit, the adjustment of the variable resistor 154, the percentage of ripple in the feedback signal, the fixed values of the resistors 140, 142 and the capacitor 144, the amount of ripple across the signal input terminals 128, 130 will affect the bias of the transistor 88 at any given input signal level. Thus it will be apparent that by adjusting the amount and percentage of ripple of the D.C. feedback loop as impressed upon a given amount and kind of D.C. signal input, the effectiveness of the signal source is modified so as to alter the output voltage derived as explained herein. Furthermore, because of the inherently chopped nature of the A.C. power output voltage wave form and the consequently similarly chopped wave form of the derived D.C. feedback voltage, the ripple percentage of the feedback voltage constantly varies from off to full conduction. Thereby, by varying the effectiveness of the filter network, as provided for by the variable resistor 154 in series with the capacitor 156, the effectiveness of the feedback circuit is altered during partial conduction as compared to full conduction when with the same amount of filtering the ripple percentage is reduced. This allows for a wide variety of output voltage levels or conduction angles when the signal strength is less than maximum and is dependent upon the adjustment of the variable resistor 154 so that the operator by varying the setting of this resistor can change the configuration of the curve of output voltage versus signal voltage.

Misfiring in lighting intensity control circuits has, in the past, caused needless stress on the power semiconductor elements. In general, misfiring of the regulated silicon controlled rectifiers originates from two sources. One of these is false signals appearing between the gate and cathode of the controlled rectifier, thus causing the rectifier to fire. The second is a fast rising voltage applied to the anode of the controlled rectifier which also may cause said rectifier to fire below its normal breakover voltage. For the most part the undesirable conditions and signals will be found to occur during the transitory period when line voltage is either applied or removed. During such period associated line powered relays, contactors, circuit breakers and the like arc and their contacts bounce. In consequence the connected circuit is subjected to a great number of fast rising and dropping voltages and to high frequency oscillations that are not synchronized to the power line frequency but, rather, to the intermittent mechanical operation of the switching contacts.

To overcome this source of trouble the biasing of the PNP transistor 82 by the diode 86, the resistors 84, 180, 152 and 182, the transistor 88 and the resistor 142 is so arranged as to allow the insertion of the variable resistor 150 into the emitter circuit of the transistor 88. Said variable resistor 150 acts as a minimum bias adjustment for the transistor 82 and thus determines the minimum level of charge developed on the capacitor 80 in the absence of an input signal voltage across the terminals 128, 130. Normally the capacitor 80 discharges each half cycle of line voltage for synchronization purposes and if the charge level is held to a low value by leakage across the emitter to collector junction of the transistor 82 the voltage developed across the secondaries 90, 92 of the pulse transformer 94 will be insufficient to fire the regulated silicon controlled rectifiers. Thus during transient periods when the firing circuit 24 sees false synchronization periods caused by intermittent openings of contacts, the firing pulse that is derived will not cause the regulated silicon controlled rectifiers to misfire, providing, of course, that the signal voltage from the remote intensity station has been, as it may easily be, removed.

To further adapt this aspect of my light dimming A.C. power unit as well as the overall performance of said unit to a wide range of environmental temperatures, the diode 86 is included in the biasing arrangement. Said diode is inserted in series with the resistor 180 and thus is able to compensate, by virtue of its negative resistance versus temperature characteristic, for the change in collector current in the transistors 82 and 88 under varying temperatures. This stabilizes the adjustment of the variable resistor 150 and the charge on the capacitor 80.

The second cause of misfiring, to wit, fast rising line voltages is minimized by an R-C "snubbing" circuit formed by a resistor 184 in series with a capacitor 186 and jointly connected between the line A.C. terminal 188 and the load A.C. terminal 190 of the full wave power bridge 102.

Transient overvoltages such as might be caused by the sudden collapse of a voltage exciting any inductive device in shunt with the line terminal 20 and the common return terminal 22 are attenuated by a selenium transient suppressor 192 connected between the power line A.C. bridge terminal 188 and the common return bus 38.

In order to protect the matched pair of regulated power semiconductors 96, 98 from overloading, which could occur during the normal attachment of lamp loads to my light dimming A.C. power unit, a current sensitive trip circuit 194 is provided to disarm the firing circuit 24 (as by shorting the capacitor 80) when the current at the power output terminal 116 exceeds a predetermined maximum, said trip circuit 194 acting as a shorting device that remains locked on until manually released after the occurrence of an overcurrent condition even if said overcurrent condition is removed, as it obviously will be when the firing circuit is disarmed. This current sensitive trip circuit 194 is designed to coordinate the protection afforded by the semiconductor fuse 32 for the first few cycles of overload with the limited overload capacities of semiconductors after these first few cycles. At the same time the design allows for a specified attachment of cold incandescent lamp filaments while my novel light dimming A.C. power unit is phased on (hot patching) without the needless tripping of the current sensitive trip circuit.

The power supply for the current sensitive (overcurrent) trip circuit 194 is taken directly from the D.C. voltage developed between the low voltage positive bus 70 and the D.C. common negative bus 68. The voltage is taken at a junction 196 through a blocking diode 198 and is filtered by a capacitor 200 and a resistor 202. The resulting voltage applied to a positive D.C. bus 204 is a low ripple, almost flat, D.C. voltage which powers the overcurrent trip circuit 194.

Said overcurrent trip circuit includes an output current level detector 206 which consists of resistors 208, 210, 212, 214, 216, 218 and 220 and PNP transistors 222 and 224 connected in a network in the configuration of a transistorized Schmitt trigger which will derive an output pulse or pulses, as soon will be described, responsive to the presence of current in excess of a certain minimum in the circuit to the lamp load.

The signal for the current level detector 206 is developed across the current shunt 34 that, as was noted previously, is series connected in the power line to the lamp load. Junctions 124 and 226 at the ends of the current shunt act as potential terminals and the voltage developed across these terminals feeds the primary 228 of a step-up transformer 230. The secondary 232 of said transformer is connected at one terminal thereof through a variable resistor 234 in series with a blocking capacitor 236 to the base of the input transistor 224 at a junction 238. The other terminal of the secondary 232 is connected to the heavily filtered positive D.C. bus 204.

The alternating voltage developed by the load current across the current shunt resistor 34 is thus, through the transformer 230, impressed across the emitter to base junction of the input transistor 224 of the Schmitt trigger circuit, i.e., the current level detector 206, and will cause this transistor to be reverse biased for a portion of each cycle providing that the voltage so derived is sufficient to overcome the forward bias voltage developed across the resistor 208 and the junction impedance of the transistor 224. At the point that the forward bias is nulled the input transistor 224 stops conducting and the output transistor 222 is turned on due to the loss of reverse bias at the junction 240. As the output transistor 222 starts to conduct, a pulse voltage is developed across the resistor 210, the initiation, i.e., starting point of which is dependent upon the magnitude and the conduction angle of the output power current and the duration of which is dependent upon the magnitude of the output power current as it influences the rate of fall of such output current.

The current level detector 206 can form a pulse the maximum length of which is something less than one half of the duration of the line current cycle. Under full load current the various parameters of the current level detector are so selected and are further adjusted by the variable resistor 234 as to provide a pulse length considerably less than one half cycle. Thus under overloads with a 180° conduction angle the duration of the pulse is extended by virtue of the increased rate of current rise and the reduced rate of current fall to a duration that is critical or in other words, sufficient to enable the associated circuitry to turn off the A.C. power unit.

Under conditions when the conduction angle is less than 180°, two pulses per cycle will be emitted by the current level detector 206. The first pulse is a function of the conduction angle with a duration that is related to the slope as it is related to the magnitude of the current of the remaining portion of the conductive cycle. The second pulse is a function of the duration or recovery time of the back swing of the input transformer 230 which, since the transformer is an inductive device, is related to the total energy content of the conductive pulse as stored by the core of the input transformer and as is dissipated by the parameters associated with said transformer.

By proper selection of the parameters associated with said transformer 230 overloads can be detected regardless of the phased back condition of the load current. Thus the presence of an inductive device in the current sensitive trip circuit 194 stores energy so that said device is sensitive to high currents even at less than the full 180° conduction angle.

The voltage pulses developed across the output load resistor 210 of the Schmitt trigger circuit charges a capacitor 242 through a current limiting resistor 244. Depending upon the duration and number of pulses emitted by the Schmitt trigger circuit as compared to the duration of off time at the output of said circuit, a level of charge is developed upon the capacitor 242 which is a function of the current value carried in the power circuit but delayed by the R-C network formed by the capacitor 242, and the resistors 210 and 244. The time constant of this R-C network is so selected as to compensate for the cold lamp filament inrush currents before developing a critical voltage across the capacitor 242.

When such a critical voltage is developed upon the capacitor 242 as established by the voltage between the D.C. filtered positive bus 204 and the D.C. common bus 68, values of resistors 246 and 248 and the peak point voltage of a double-base diode 250, said double-based diode will go into a negative resistance condition thereby developing a voltage across the resistor 248 that is applied to the gate of a silicon control rectifier 252 through a current limiting resistor 254 so as to fire said rectifier. Said rectifier is connected between the positive D.C. bus 204 and the common D.C. return bus 68 with a blocking diode 253 interposed between the bus 204 and the anode of the rectifier.

Firing the silicon controlled rectifier 252 completes a low resistance shunt path for and which discharges the capacitor 80 whereby to turn off, i.e., disarm, the firing circuit 24 for the matched pair of power silicon controlled rectifiers 96, 98. The capacitor 80 is discharged through a blocking diode 256 and remains discharged so long as the silicon controlled rectifier 254 stays in its forward conduction state which is so long as the forward voltage (anode positive with respect to cathode) and minimum holding current requirements for said rectifier are maintained. This condition is fulfilled by the capacitor 200 and the resistor 202 which provide the necessary degree of filtering required and thereby form a locking circuit that supplies a voltage to the anode of the silicon controlled rectifier 252 that never falls to the level of the cathode voltage, staying sufficiently higher to insure a flow of a minimum holding current through said rectifier. Thereby once the current level detector 206 senses an overcurrent condition and fires the silicon controlled rectifier 252, the capacitor 80 is shorted and the firing circuit remains locked out by said rectifier despite the fact that the overcurrent condition will immediately thereafter cease because the rectifiers 96, 98 no longer have firing pulses applied to them. It is necessary in order to restore the operation of my power unit to manually render the shorting device constituted by the silicon controlled rectifier 252 inoperable in the manner soon to be described.

To indicate the tripped (disarmed) condition of my light dimming A.C. power unit, i.e., the fired or conducting state of the silicon controlled rectifier 252, a neon pilot light 258 is provided which may, if desired, be located at the remote station 64. At said remote station a positive D.C. voltage related to the condition of the A.C. power unit is provided at a junction 260. This voltage is developed across a resistor 262 that is shunted by the neon pilot light 258 in series with a current limiting resistor 264. The foregoing series-parallel network is connected by a lead wire 268, 268a through a resistor 266 to the bus 68. Said lead wire 268, 268a also is connected to a bus 270 that runs from the positive terminal of the capacitor 80 through the blocking diode 256 to the anode of the silicon controlled rectifier 252.

The resistors 262 and 266 form a voltage divider which limits the voltage developed across said resistor 262 by virtue of the values used to a voltage just under the critical ignition voltage requirements of the neon pilot light 258. When the silicon controlled rectifier 252 is fired, the resistor 266 is shorted out through the common bus 270, thus increasing the voltage developed across the resistor 262 and thereby lighting the neon pilot light as a signal of the tripped condition of the light dimming A.C. power unit.

The overcurrent trip (shorting of the capacitor 80 through the conducting silicon controlled rectifier 252) will remain in its tripped condition, i.e., with the shorting circuit locked on, until anyone of three conditions becomes effective: (1) a momentary removal of potential from the line input terminal 20, or (2) the momentary opening of the circuit breaker 30, or (3) the momentary opening of the normally closed reset button 62 at the power supply unit or any remote station 64. If at such time the overcurrent condition which caused the initial tripping of the overcurrent circuit has been removed the A.C. power unit again will function normally. If such condition has not been removed the circuit once more will pass through the cycle necessary to refire the silicon controlled rectifier 252 and retrip. It will be observed that opening the power circuit at the terminal 20 or at the circuit breaker 30 or at the button 62, has the effect of removing voltage from the positive D.C. bus 204 and in this manner halting the firing of the silicon controlled rectifier 252 so that the capacitor 80 no longer will be shorted.

To adapt the current level detector 206 to the wide range of temperatures that are found where the light dimming A.C. power unit is expected to perform, a reverse biased diode 272 is included in the biasing network for the Schmitt trigger circuit. The negative resistance characteristic of said diode 272 is utilized to compensate for the temperature sensitive variations of the collector current in the input transistor 224 of the Schmitt trigger circuit. It thereby is possible to maintain the initial calibration of the current level detector 194 as adjusted by the variable resistor 234 over a wide range of temperatures.

Although the percentage of energy lost in power semiconductors such as the semiconductors 104, 106, 108, 110 and the matched pair of silicon controlled rectifiers 96, 98 is small compared to the total energy delivered to the load terminal 116, it nevertheless is sufficient to generate a considerable quantity of heat. This heat must be rapidly dissipated into the ambient air or elsewhere, or else in a short period of time the junction temperatures of the semiconductors, and particularly those of the matched pair of silicon controlled rectifiers 96, 98, would raise beyond their desired maxima. It is even further desirable to maintain the junction temperatures of the power semiconductors well below their maximum ratings in order to be able to accommodate transient temperature excursions caused, for example, by "hot patching" or by momentary overloads without exceeding these maxima.

In order to achieve these results sufficiently large heat sinks and forced air cooling preferably are employed. The unit herein described utilizes two heat sinks, 274, 276 with the sundry power semiconductor devices 96, 98, 104, 106, 108 and 110 mounted in multiple thereon. Adjacent to these heat sinks there is located a fan 278 powered between the line bus 280 and the common return bus 38. Such fan draws ambient air through the chassis of the A.C. power unit and forces it past the heat sinks 274, 276 after which the air is expelled from the chassis. Consequently, the maximum ratings for any given light dimming A.C. power unit are based upon a given maximum ambient temperature entering the chassis, the cooling efficiency of the fan and the heat sinks, the total heat dissipation of the sundry components, the design maxima for the various components and the maximum permissible transient temperature excursion allowed before the protective devices operate.

To provide for "thermal overloads" such, for instance, as might be caused by overly high ambient temperature, fan stoppage, or reduced efficiency of the heat sinks due, for instance, to an accumulation of dust and dirt, a thermally sensitive relay 282 is physically located so as to be responsive to the temperatures of the heat sinks 274, 276. Said relay 282 is so adjusted that its normally open contacts will close when either of the heat sinks reaches a designed predetermined critical temperature. Because such a device possesses a considerable time constant for operation, the heat sinks themselves are constructed and arranged to have a high thermal capacity. With such a thermal capacity it then is possible to compensate for the protracted operate time of the thermal relay by retarding the rate of temperature rise.

When the thermal relay 282 closes, the normally open contacts 284, 286 thereof short out the silicon controlled rectifier 252 through a lead wire 288, 288a connected to the D.C. common terminal 56 of the full wave rectifying bridge 48 and through a return wire 290, 290a connected to the bus 270.

The effect produced by the closure of the relay 282 is the same as that described hereinabove when the silicon controlled rectifier 252 is fired so as to disarm the firing circuit for the output silicon controlled rectifiers 96, 98, turning off the latter and lighting the pilot light 258. However it will be noted that under thermal overload conditions the circuit cannot be reset as previously described by removing voltage from the bus 204 but instead requires the physical opening of the thermal relay 282. Inasmuch as the heat sink possesses a considerable thermal time constant by virtue of its mass, this period is sufficiently long for the ascertainment of the problem, i.e., a thermal overload rather than a current overload, so that the operator can take suitable steps to correct the same.

If desired, a different thermal relay 282 may be physically located to be responsive to the temperature of each different heat sink in which instance the normally open contacts of both such relays would be connected in parallel.

By way of example and for the sake of completeness I have set forth below the values or types of the various resistors, capacitors and solid state elements, the nature of the inductive elements already having been given, these values being appropriate for a signal input ranging up to an average value of about 22.5 volts D.C.:

| Number | Description | Value or Type |
|---|---|---|
| 34 | Resistor | 8" of No. 8 AA wire. |
| 44 | ---do--- | 4.7K ohms. |
| 46 | Capacitor | 1 mfd. |
| 48 | Four diodes | 1N1605. |
| 58 | Resistor | 3.3K ohms. |
| 72 | Zener diode | 1N1527. |
| 74 | Resistor | 270 ohms. |
| 76 | Double-based diode | 2N1671A. |
| 80 | Capacitor | 0.25 mfd. |
| 82 | PNP transistor | 2N217. |
| 84 | Resistor | 510 ohms. |
| 86 | Diode | 1N91. |
| 88 | PNP transistor | 2N217. |
| 96, 98 | Matched pair of silicon controlled rectifiers | C50B. |
| 104 | Diode | 1N3290. |
| 106 | ---do--- | 1N3290R. |
| 108 | ---do--- | 1N3290R. |
| 110 | ---do--- | 1N3290. |
| 118 | Capacitor | 0.01 mfd. |
| 136 | Diode | 1N1692. |
| 138 | Resistor | 47K ohms. |
| 140 | ---do--- | 3.9K ohms. |
| 142 | ---do--- | 3.3K ohms. |
| 144 | Capacitor | 1 mfd. |
| 146 | Potentiometer | 4K ohms. |
| 148 | Capacitor | 500 mfd. |
| 150 | Resistor | 500 ohms. |
| 152 | ---do--- | 1.5K ohms. |
| 154 | ---do--- | 10K ohms. |
| 156 | Capacitor | 5 mfd. |
| 170, 172 | Diodes | 1N1692. |
| 180 | Resistor | 22K ohms. |
| 182 | ---do--- | 10K ohms. |
| 184 | ---do--- | 47 ohms. |
| 186 | Capacitor | 0.25 mfd. |
| 192 | Selenium transient suppressor | SP120. |
| 198 | Diode | 1N1692. |
| 200 | Capacitor | 50 mfd. |
| 202 | Resistor | 100 ohms. |
| 208 | ---do--- | 51 ohms. |
| 210 | ---do--- | 10K ohms. |
| 212 | ---do--- | 15K ohms. |
| 214 | ---do--- | 18K ohms. |
| 216 | ---do--- | 10K ohms. |
| 218 | ---do--- | 5.1K ohms. |
| 220 | ---do--- | 56K ohms. |
| 222 | PNP transistor | 2N217. |
| 224 | ---do--- | 2N217. |
| 234 | Resistor | 4K ohms. |
| 236 | Capacitor | 25 mfd. |
| 242 | ---do--- | 10 mfd. |
| 244 | Resistor | 12K ohms. |
| 246 | ---do--- | 470 ohms. |
| 248 | ---do--- | 27 ohms. |
| 250 | Double-based diode | 2N1671A. |
| 252 | Silicon controlled rectifier | 2N1930. |
| 253 | Diode | 1N1692. |
| 254 | Resistor | 4.7 ohms. |
| 256 | Diode | 1N1692. |
| 262 | Resistor | 100K ohms. |
| 264 | ---do--- | 2.4K ohms. |
| 266 | ---do--- | 47K ohms. |
| 272 | Diode | 1N91. |

The operation of my novel light dimming A.C. power unit is already apparent from the preceding description. Nevertheless, to expedite understanding of the same I have, in FIGS. 3 through 11, through the medium of various curves and graphs, illustrated certain voltage relationships which will aid in clarifying and appreciating the workings of the unit.

Referring now to FIGS. 3(a) through 3(d), FIG. 3(a) illustrates the line voltage, i.e., the power input voltage. This, of course, is a sine curve which passes through zero voltage at zero degrees in time and at 180° in time and is alternatively positive and negative in succeeding half cycles, having a peak value of 170 volts. Said voltage appears between the line terminals 20, 22 and is the reference voltage against which other voltages are compared.

FIG. 3(b) illustrates the voltage after it has been shifted (advanced) 15° by the R-C fixed phase shifting network 42. This voltage appears between the A.C. input terminals 50, 52 to the full wave rectifying bridge 48 and has a peak value of 130 volts. It is this forward shifted voltage which applied to the firing circuit 24 enables said firing circuit to have sufficient energy at line voltage zero to provide a firing pulse to the matched pair of silicon controlled rectifiers 96, 98 when a full 180° conduction signal is required.

FIG. 3(c) illustrates the pulsating rectified voltage (130 volts peak) supplied to the firing circuit by the full wave rectifying bridge 48 and appears between the D.C. output terminals 54, 56 of said bridge. It will be observed that the zero voltage points of this pulsating D.C. voltage, although synchronized with line voltage are 15° ahead of the zero voltage points of said line voltage.

FIG. 3(d) illustrates the D.C. voltage applied to the firing circuit 24 after clipping by the Zener diode 72. The clipping is down to 22 volts in order to provide an applied voltage compatible with the transistor circuitry. Obviously, the zero voltage points of the clipped full wave D.C. which are used for synchronizing the capacitor 80 with the line voltage are 15° ahead of the zero voltage points of the line voltage.

Referring now to FIGS. 4(a) through 4(h), the same show certain voltage relationships at a 180° conduction angle.

FIG. 4(a) illustrates line voltage as a reference.

FIG. 4(b) illustrates the signal voltage applied to the input terminals 128, 130, the signal voltage having a peak of 35 volts (average of about 22.5 volts) and being of a configuration which will bring about a maximum conduction angle, i.e., 180°.

FIG. 4(c) shows the feedback voltage developed across the entire potentiometer 146, and having a peak of 42 volts.

FIG. 4(d) shows the voltage developed across the resistor 142 which is the base-to-collector resistor of the transistor 88. It will be observed that in the illustrated condition of the unit this voltage peaks at about seven volts.

Figure 1:
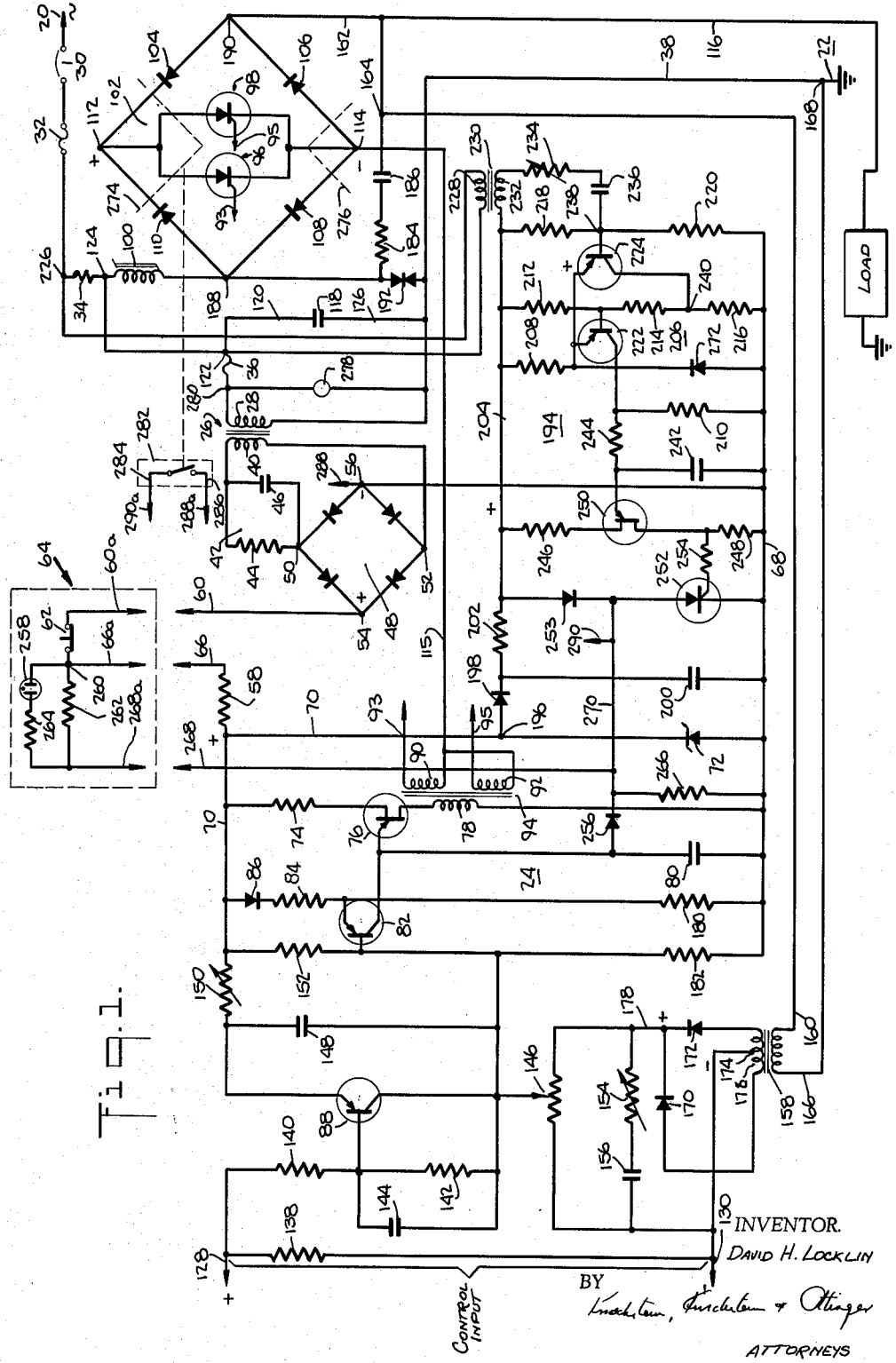

FIG. 4(e) shows the voltage developed across the resistor 182. It will be observed that this voltage has a plateau of 17.5 volts at full conduction angle. Attention also is directed to the fact that this plateau is quickly reached, i.e., in about 15°, so that maximum voltage is available at about the time that line voltage passes through zero.

FIG. 4(f) shows the saw tooth voltage output of the double-based diode pulse generator or, more specifically, the voltage appearing across the capacitor 80. Attention is directed to the fact that the first peak of this train of voltage pulses is at the zero degree transition point of line voltage this being possible because voltage is initially applied to said generator 15° before supply line zero. Only the first pulse of this series of pulses is effective each half cycle for a reason which previously was pointed out, to wit, that the silicon controlled rectifiers 96, 98 are avalanche devices so that once they are fired they disregard any subsequent firing pulses during a conduction cycle.

FIG. 4(g) illustrates the voltage pulse outputs appearing across each of the pulse transformer secondaries 90, 92. These, of course, are the actual pulses used to fire the silicon controlled rectifiers 96, 98 and here again it will be seen that the first pulse is at substantially line voltage zero, subsequent pulses being of no consequence.

Finally, FIG. 4(h) shows the voltage output appearing across the buses 38, 116, this being the voltage that is applied across the incandescent lighting load attached to my unit. It will be appreciated from inspection of this last curve that conduction starts at line voltage zero so that maximum voltage is delivered to the load, said curve being substantially a replica of the input line voltage of FIG. 4(a).

FIGS. 5(a) through 5(h) show voltages at the same circuit points as FIGS. 4(a) through 4(h), respectively, the difference being that in the series of curves shown in FIGS. 5(a) through 5(h) the signal voltage has a peak of 28 volts (see FIG. 5(b)) rather than 35 volts in order to obtain a 135° conduction angle. The feed back voltage across the potentiometer 146 now will peak at 38 (see FIG. 5(c)) volts rather than 42 volts and the voltage across the resistor 142 now will peak at 3 volts (see FIG. 5(d)) rather than 7 volts. Likewise the plateau of voltage across the resistor 82 now will be 19 volts (see FIG. 5(e)) rather than 17.5 volts. Due to the lowered signal input voltage the first pulse discharged through the double-based diode 76 and the primary of the pulse transformer 78 will occur at 45° line voltage (see FIG. 5(f)) and hence the first pulse at the secondary of said transformer will appear at the 45° point (see FIG. 5(g)). Therefore, as is clear from FIG. 5(h), the load voltage output will first start to rise at 45° line voltage, thus providing a 135° conduction angle.

FIGS. 6(a) through 6(h) and 7(a) through 7(h) show corresponding voltage curves for conduction angles of 90° and 45° respectively, the peak voltages for FIGS. 6(b), 6(c) and 6(d) being 15 volts, 29 volts and 2 volts respectively and the peak voltages for FIGS. 7(b), 7(c), and 7(d) being 4 volts, 12 volts and 1.1 volts respectively. The plateau voltage for 6(e) is 19.5 volts and the plateau voltage for FIG. 7(e) is 20 volts.

FIGS. 8(a) through 8(f) and FIGS. 9(a) through 9(f) are a series of voltage curves which illustrate the operation of the overcurrent trip circuit.

In FIG. 8(a) I have once again used the line voltage curve as a reference.

FIG. 8(b) shows the voltage developed across the current shunt resistor 34, this voltage being a measure of the current flowing in the load circuit inasmuch as said resistor is series connected in this circuit. The illustrated curve is for current at full load which will not cause the overcurrent circuit to trip and is shown to fluctuate between a positive and negative voltage of 24 millivolts. The slight spike near the 15° mark of each half cycle is due to circuit parameters.

FIG. 8(c) shows the voltage actually applied to the overcurrent trip circuit, this being the voltage across the secondary 232 of the step-up overcurrent sensing transformer 230. Due to the step-up of said transformer the configuration of the curve of FIG. 4(b) is exaggerated. The voltage of the curve, FIG. 8(c), peaks at about 600 millivolts in each half cycle.

In FIG. 8(d) I have illustrated the voltage appearing across the resistor 220 this being the voltage input to the Schmitt trigger circuit. I have also shown in dotted lines in the same figure the two threshold voltages for the Schmitt trigger. The upper dotted line is 18.3 volts which is the "on" voltage threshold for the Schmitt trigger circuit and the lower dotted line is 18.2 volts which is the "off" voltage threshold for the Schmitt trigger circuit. During the first half-cycle illustrated when the voltage in FIG. 8(d) is negative there will, of course, be no pulse emanating from the Schmitt trigger circuit. However at approximately 195° line voltage the signal voltage input appearing across the resistor 220 goes sufficiently positive to fire the Schmitt trigger circuit and the voltage stays sufficiently positive until about 300° line voltage to keep the Schmitt trigger circuit turned on so that the Schmitt trigger circuit will generate an output pulse running from about 195° to about 300°. This pulse is shown in FIG. 8(e) the same having a fixed peak of 17 volts.

Finally, in FIG. 8(f) I have shown the curve of the voltage applied to the emitter of the double-based diode 250, this also being the voltage appearing across the capacitor 242. Also illustrated in this figure is a dotted line at 13.5 volts which is the peak point voltage of said double-based diode. Inasmuch as the voltage across the capacitor 242 does not reach this peak point voltage (an applied voltage of 17 volts for 105° will not charge the capacitor 242 to 13.5 volts) the double-based diode will not be changed into a negative resistance state and the silicon controlled rectifier 252 will not be fired. Of course, if the single pulse of FIG. 8(e) were of greater duration, i.e., started earlier or terminated later due to a faster rising or higher amplitude voltage curve in FIG. 8(b), the peak voltage of FIG. 8(f) would cross the peak point voltage of the double-based diode and cause the same to fire the silicon controlled rectifier 252 so as to disarm the firing circuit 24.

In FIGS. 9(a) through 9(f) a set of curves has been illustrated which will fire the silicon controlled rectifier 252. Since the effect of a simple overcurrent condition at 180° conduction angle is apparent from a mere inspection of FIGS. 8(a) through 8(f), instead of showing the curves corresponding to such condition I have in FIGS. 9(a) through 9(f) illustrated the voltages for an overcurrent condition at a 90° conduction angle. The various curves of FIGS. 9(a) through 9(h) illustrate voltages at the same points of the circuit as those for FIGS. 8(a) through 8(h); however the curves are quite different due to the fact that a 90° conduction angle instead of a 180° conduction angle is present and also due to the fact that an overcurrent condition is present. Thus, referring FIG. 9(c). Moreover another phenomenon is apparent across the current shunt resistor 34 starts at 90° and 270° instead of zero degrees and 180° line voltage and the spikes are quite pronounced due to the steep wave front of the output line voltage as seen, for instance, in FIG. 6(h). These peaks are even more pronounced in FIG. 9(c). Moreover another phenomenon is apparent in FIG. 9(c). This is the presence of a positive peak early in the second (positive) half cycle which peak appears at about 180°. Said peak is due to the energy stored in the transformer 230 and discharged from said transformer during the transitive period of A.C. line voltage. Of course there is a later second peak in the positive cycle occurring at 270° which is due to overcurrent conditions in the load circuit during the second half cycle. The overcurrent conditions occurring during the first half cycle create a negative high voltage at 90° this high voltage having no effect upon the Schmitt trigger circuit because it is negative. Nevertheless it is because of this high negative voltage during the first half cycle that the first early positive peak occurs at 180°.

Figure 9:
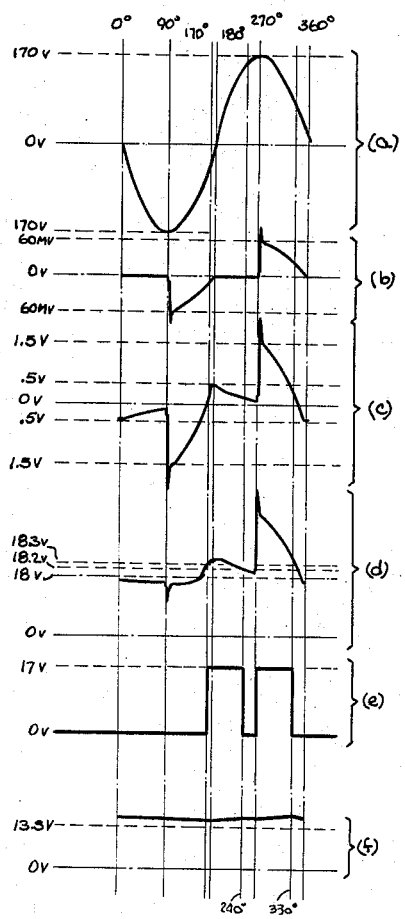

Turning now to FIGS. 9(d) and 9(e) it will be seen that the signal input voltage to the Schmitt trigger circuit crosses the "on" threshold voltage level at about 170° and again at about 270° and falls below the "off" threshold voltage at about 240° and about 330°. Therefore there will be two pulses generated by the Schmitt trigger circuit, these being shown in FIG. 9(e). Said pulses deliver sufficient energy (a charging period of about 130°) to the capacitor 242 to raise the voltage appearing across the same to above the 13.5 peak point voltage for the double-based diode 252 whereby the same will fire to disarm the firing circuit 24. Of course, once the rectifier 252 has avalanched it will, because the voltage in the bus 204 is substantially filtered, stay fired so as to form a locked-on shorting circuit for the capacitor 80 whereby the firing circuit will remain disarmed until positive voltage is removed from the bus 204.

Reference has been made earlier herein to the nonunity relationship between the turn-on time constant and the turn-off time constant of the unit, it having been explained that it is desirable for the turn-on time constant to be substantially greater than the turn-off time constant and that this feature is obtained through the use of the charge and discharge path of the signal delay capacitor 148. The results of the use of this capacitor and its associated circuitry are shown in FIGS. 10(a) and 10(b).

Figure 10:
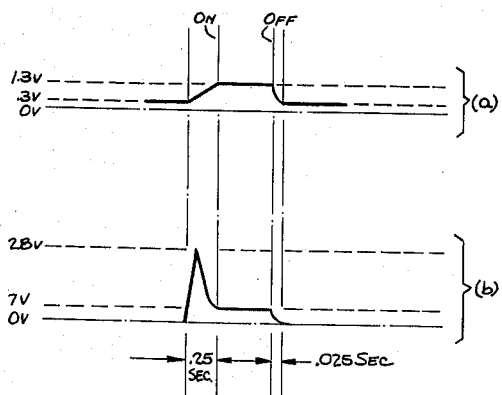
Figure 2:
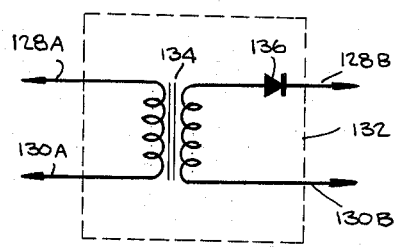

The curve of FIG. 10(b) illustrates the voltage appearing across the resistor 142, the same being a function inter alia of signal input voltage, and the curve of FIG. 10(a) illustrates the voltage appearing across the signal delay capacitor 148.

The curve of FIG. 10(b) shows first the application of a step-up in signal input voltage and then the removal of such step-up voltage. It will be seen by reference to this FIG. 10(b) that the time to apply the step-up voltage is substantially equal to the time to remove the step-up voltage, to wit, approximately 0.025 second. But as seen from FIG. 10(a) the signal delay capacitor 148 stretches out from 0.025 second to 0.25 second the time for the full voltage rise to appear across the signal delay capacitor, this being due to the charging time of the capacitor which capacitor is, as noted previously, of substantial capacity, to wit, 500 mfd. Nevertheless when the signal input voltage step is removed the voltage appearing across the capacitor quickly dissipates through its discharge path in about the time it takes to remove the voltage so that the turn-off time constant is considerably shorter than the turn-on time constant.

Figure 11:
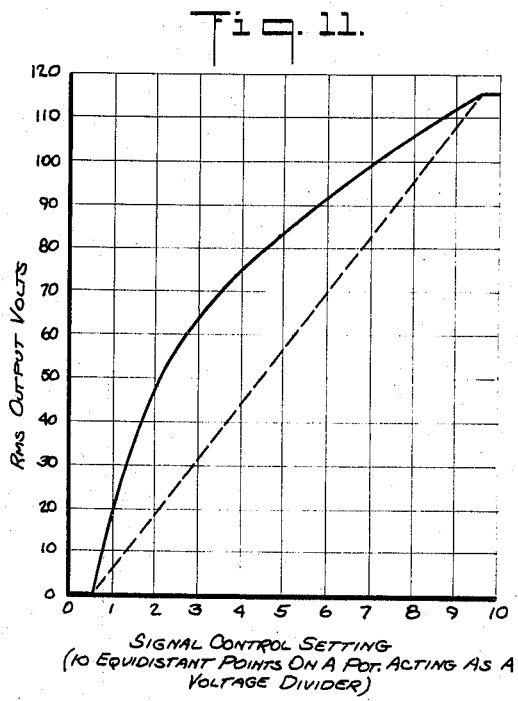

It frequently is desirable to have different predetermined voltage outputs for the same level of signal voltage input or to obtain different slopes for the curve of output voltage level versus signal input level. I have mentioned previously that this can be done by adjusting the variable resistor 154 and in FIG. 11 I have shown the aforesaid curves at two different settings of said resistor. Attention is directed to the fact that by varying the setting of said resistor the curve secured may be substantially flat or may be non-linear if that is preferred by the operator.

It thus will be seen that I have provided devices and a method of using the same which achieve the several objects of my invention, and which are well adapted to meet the conditions of practical use.

As various possible embodiments might be made of the above invention, and as various changes might be made in the embodiments above set forth, it is to be understood that all matter herein described or shown in the accompanying drawing is to be interpreted as illustrative and not in a limiting sense.

Having thus described my invention, I claim as new and desire to secure by Letters Patent:

1. In combination in a light dimming A.C. power unit for an incandescent lamp load wherein the magnitude of an input voltage determines lamp brilliance:
 (a) power rectifiers connected in a full wave D.C. polarizing bridge configuration with the A.C. terminals thereof adapted to be connected in series with an incandescent lamp load between the two sides of an A.C. power line,
 (b) at least two silicon controlled power rectifiers connected in parallel and in the same sense between the D.C. terminals of said bridge,
 (c) a saturating filter reactor with a closed iron core having a soft hysteresis loop and with a winding of less than fifty turns, said saturating filter reactor being connected in series between one side of the line and said bridge, said reactor being constructed and arranged to have a high initial impedance so as to limit during and immediately after the firing of said silicon controlled power rectifiers the rate of current rise in said silicon controlled power rectifiers and to thereafter still possess considerable reluctance so as to reduce the rate of voltage and current rise in said silicon controlled power rectifiers thus limiting the shock of fast rising current that would otherwise cause audible lamp filament noise and objectionable harmonics at radio frequency,
 (d) an input circuit including signal input terminals across which an input signal voltage of controllable magnitude is impressed for determining lamp brilliance, an impedance and a potentiometer connected in series across said input terminals, a first PNP transistor, said impedance being connected in the base-to-collector circuit of said first transistor, the input signal developing a voltage across the impedance that reverse biases the base-to-collector junction of the first transistor so that said first transistor functions as an emitter follower, a signal delay first capacitor connected in the emitter-to-collector circuit of the first transistor, and a first variable resistor in the emitter circuit of the first transistor,
 (e) a firing circuit for said silicon controlled power rectifiers, said firing circuit being arranged to be controlled by said input circuit and comprising a pulsating D.C. source, a second PNP transistor, the emitter-to-base of the second transistor being connected across said pulsating D.C. source, the emitter-to-collector circuit of the first transistor being connected across the emitter-to-base circuit of the second transistor so that the emitter-to-collector junction of the second transistor provides a variable resistance responsive to the signal input, a second capacitor connected for charging across the pulsating D.C. source in series with the emitter-to-collector circuit of the second transistor, a first double-based diode having its bases connected across the pulsating D.C. source and its emitter connected to the collector of the second transistor so that the first double-based diode and the second capacitor act as a relaxation oscillator discharging each time the charge on the second capacitor reaches the peak point voltage of the first double-based diode, and a pulse transformer having a primary winding connected in series with the double bases and having secondary windings connected to the control terminals of the silicon controlled power rectifiers so that said oscillator will provide a firing pulse the phase of which is variable in response to the variation in the signal impressed by the input circuit on the firing circuit, (f) said pulsating D.C. source comprising means to provide an A.C. control voltage that leads the A.C. power voltage by a fixed amount between about 10° and about 30°, means to rectify said A.C. control voltage, and means to clip said rectified voltage, (g) an overcurrent sensing circuit comprising means responsive to the output current from the polarizing bridge, said overcurrent sensing circuit further including and inductance means fed by the responsive means to store energy and render said overcurrent sensing circuit sensitive to overcurrent at less than a full conduction angle, said overcurrent sensing circuit also including a third capacitor to absorb energy during the period of current in-rush to a cold incandescent lamp filament so as to render the sensing circuit insensitive to said in-rush during such period, and said overcurrent sensing circuit including a Schmitt trigger having its input connected to said responsive means, (h) a disarming circuit for the firing circuit, said disarming circuit comprising said third capacitor connected to the output of the Schmitt trigger so as to have intermittently applied thereto the pulse outputs of said trigger, means to supply a smooth D.C. voltage, a second double-based diode having its bases connected across the smooth D.C. voltage and its emitter connected to the third capacitor so as to go into a negative resistance state when the third capacitor is charged by the Schmitt trigger to the peak point voltage of the second double-based diode, said peak point voltage being such that it is attained upon the presence of an overcurrent condition in the output current from the polarizing bridge except for the in-rush current to a cold incandescent lamp load to which the sensing circuit is rendered insensitive by the third capacitor, a silicon controlled control rectifier connected across the second capacitor with its control terminal connected to one of the bases of the second double-based diode, the anode-to-cathode circuit of the silicon controlled control rectifier being connected across the smooth D.C. voltage so that upon the occurrence of an overcurrent condition in the output current from the polarizing bridge the silicon controlled control rectifier will short the second capacitor so as to disarm the firing circuit and will maintain the short so long as said D.C. voltage is supplied, (i) a feed-back circuit including a transformer having a primary winding arranged to be connected across the incandescent lighting load, a rectifying circuit connected across the secondary winding of the transformer, and a fourth capacitor and a second variable resistor connected as an R-C filter network across the output of the rectifying circuit, the output of said filter network being connected across the potentiometer of the input circuit so as by adjustment of the potentiometer and the second variable resistor to selectively modify the amplitude and the ripple content, respectively, of the rectified voltage supplied by the feedback circuit to the input circuit, (j) a fifth capacitor connected to shunt the saturating filter reactor, the polarizing bridge and the incandescent lamp load to dampen the high frequency components caused by the discharge of the silicon controlled power rectifiers, (k) a snubbing circuit comprising a resistor and a sixth capacitor connected in series across the A.C. terminals of the polarizing bridge to limit fast rising line voltage, and (l) means to protect the silicon controlled power rectifiers against thermal overloads comprising a heat sink on which the silicon controlled power rectifiers are mounted, and a thermally responsive relay sensitive to the temperature of the heat sink, said relay having normally open contacts connected across the second capacitor so that when the temperature of the heat sink exceeds a predetermined temperature the contacts will close to short said second capacitor and thereby disarm the firing circuit for so long as the temperature of the heat sink exceeds said temperature.

2. In combination in a light dimming A.C. power unit for an incandescent lamp load wherein the magnitude of an input voltage determines lamp brilliance:

(a) power rectifiers connected in a full wave D.C. polarizing bridge configuration with the A.C. terminals thereof adapted to be connected in series with an incandescent lamp load between the two sides of an A.C. power line, (b) at least two silicon controlled power rectifiers connected in parallel and in the same sense between the D.C. terminals of said bridge, (c) a saturating filter reactor with a closed iron core having a soft hysteresis loop and with a winding of less than fifty turns, said saturating filter reactor being connected in series between one side of the line and said bridge, said reactor being constructed and arranged to have a high initial impedance so as to limit during and immediately after the firing of said silicon controlled power rectifiers the rate of current rise in said silicon controlled power rectifiers and to thereafter still possess considerable reluctance so as to reduce the rate of voltage and current-rise in said silicon controlled power rectifiers thus limiting the shock of fast rising current that would otherwise cause audible lamp filament noise and objectionable harmonics at radio frequency, (d) an input circuit including signal input terminals across which an input signal voltage of controllable magnitude is impressed for determining lamp brilliance, a first PNP transistor, an impedance connected in the base-to-collector circuit of said first transistor, means connecting the signal input terminals to the impedance, the input signal developing a voltage across the impedance that reverse biases the base-to-collector junction of the first transistor so that said first transistor functions as an emitter follower, a signal delay first capacitor connected in the emitter-to-collector circuit of the first transistor, and a first variable resistor in the emitter circuit of the first transistor, (e) a firing circuit for said silicon controller power rectifiers, said firing circuit being arranged to be controlled by said input circuit and comprising a pulsating D.C. source, a second PNP transistor, the emitter-to-base of the second transistor being connected across said pulsating D.C. source, the emitter-to-collector circuit of the first transistor being connected across the emitter-to-base circuit of the second transistor so that the emitter-to-collector junction of the second transistor provides a variable resistance responsive to the signal input, a second capacitor connected for charging across the pulsating D.C. source in series with the emitter-to-collector circuit of the second transistor, a first double-based diode having its bases connected across the pulsating D.C. source and its emitter connected to the collector of the second transistor so that the first double-based diode and the second capacitor act as a relaxation oscillator discharging each time the charge on the second capacitor reaches the peak point voltage of the first double-based diode, and a pulse transformer having a primary winding connected in series with the double bases and having secondary windings connected to the control terminals of the silicon controlled power rectifiers so that said oscillator will provide a firing pulse the phase of which is variable in response to the variation in the signal impressed by the input circuit on the firing circuit, (f) said pulsating D.C. source comprising means to provide an A.C. control voltage that leads the A.C. power voltage by a fixed amount between about 10° and about 30°, means to rectify said A.C. control voltage, and means to clip said rectified voltage, (g) an overcurrent sensing circuit comprising means responsive to the output current from the polarizing bridge, and a Schmitt trigger having its input connected to said responsive means, and (h) a disarming circuit for the firing circuit, said disarming circuit comprising a third capacitor connected to the output of the Schmitt trigger so as to have intermittently applied thereto the pulse outputs of said trigger, means to supply a smooth D.C. voltage, a second double-base diode having its bases connected across the smooth D.C. voltage and its emitter connected to the third capacitor so as to go into a negative resistance state when the third capacitor is charged by the Schmitt trigger to the peak point voltage of the second double-based diode, said peak point voltage being such that it is attained upon the presence of an overcurrent condition in the output current from the polarizing bridge, a silicon controlled control rectifier connected across the second capacitor with its control terminal connected to one of the bases of the second double-based diode, the anode-to-cathode circuit of the silicon controlled control rectifier being connected across the smooth D.C. voltage so that upon the occurrence of an overcurrent condition in the output current from the polarizing bridge the silicon controlled control rectifier will short the second capacitor so as to disarm the firing circuit and will maintain the short so long as said D.C. voltage is supplied.

3. In combination in a light dimming A.C. power unit for an incandescent lamp load wherein the magnitude of an input voltage determines lamp brilliance:

(a) power rectifiers connected in a full wave D.C. polarizing bridge configuration with the A.C. terminals thereof adapted to be connected in series with an incandescent lamp load between the two sides of an A.C. power line, (b) at least two silicon controlled power rectifiers connected in parallel and in the same sense between the D.C. terminals of said bridge, (c) a saturating filter reactor with a closed iron core having a soft hysteresis loop and with a winding of less than fifty turns, said saturating filter reactor being connected in series between one side of the line and said bridge, said reactor being constructed and arranged to have a high initial impedance so as to limit during and immediately after the firing of said silicon controlled power rectifiers the rate of current rise in said silicon controlled power rectifiers and to thereafter still possess considerable reluctance so as to reduce the rate of voltage and current rise in said silicon controlled power rectifiers thus limiting the the shock of fast rising current that would otherwise cause audible lamp filament noise and objectionable harmonics at radio frequency, (d) an input circuit including signal input terminals across which an input signal voltage of controllable magnitude is impressed for determining lamp brilliance, a first PNP transistor, an impedance connected in the base-to-collector circuit of said first transistor, means connecting the signal input terminals to the impedance, the input signal developing a voltage across the impedance that reverse biases the base-to-collector junction of the first transmitter so that said first transistor functions as an emitter follower, a signal delay first capacitor connected in the emitter-to-collector circuit of the first transistor, and a first variable resistor in the emitter circuit of the first transistor, (e) a firing circuit for said silicon controlled power rectifiers, said firing circuit being arranged to be controlled by said input circuit and comprising a pulsating D.C. source, a second PNP transistor, the emitter-to-base of the second transistor being connected across said pulsating D.C. source, the emitter-to-collector circuit of the first transistor being connected across the emitter-to-base circuit of the second transistor so that the emitter-to-collector junction of the second transistor provides a variable resistance responsive to the signal input, a second capacitor connected for charging across the pulsating D.C. source in series with the emitter-to-collector circuit of the second transistor, a first double-based diode having its bases connected across the pulsating D.C. source and its emitter connected to the collector of the second transistor so that the first double-based diode and the second capacitor act as a relaxation oscillator discharging each time the charge on the second capacitor reaches the peak point voltage of the first double-based diode, and a pulse transformer having a primary winding connected in series with the double bases and having secondary windings connected to the control terminals of the silicon controlled power rectifiers so that said oscillator will provide a firing pulse the phase of which is variable in response to the variation in the signal impressed by the input circuit on the firing circuit, (f) a disarming circuit for the firing circuit, said disarming circuit comprising a third capacitor connected to the output of the Schmitt trigger so as to have intermittently applied thereto the pulse outputs of said trigger, means to supply a smooth D.C. voltage, a second double-based diode having its bases connected across the smooth D.C. voltage and its emitter connected to the third capacitor so as to go into a negative resistance state when the third capacitor is charged by the Schmitt trigger to the peak point voltage of the second double-based diode, said peak point voltage being such that it is attained upon the presence of an overcurrent condition in the output current from the polarizing bridge, a silicon controlled control rectifier connected across the second capacitor with its control terminal connected to one of the bases of the second double-based diode, the anode-to-cathode circuit of the silicon controlled control rectifier being connected across the smooth D.C. voltage so that upon the occurrence of an overcurrent condition in the output current from the polarizing bridge the silicon controlled control rectifier will short the second capacitor so as to disarm the firing circuit and will maintain the short so long as said D.C. voltage is supplied.

4. In combination in a light dimming A.C. power unit for an incandescent lamp load wherein the magnitude of an input voltage determines lamp brilliance:

(a) a silicon controlled power rectifier having its power terminals adapted to be connected in series with an incandescent lamp load between the two sides of an A.C. power line, (b) an input circuit including signal input terminals across which an input signal voltage of controllable magnitude is impressed for determining lamp brilliance, a first PNP transistor, an impedance connected in the base-to-collector circuit of said first transistor, means connecting the signal input terminals to the impedance, the input signal developing a voltage across the impedance that reverse biases the base-to-collector junction of the first transistor so that said first transistor functions as an emitter follower, a signal delay first capacitor connected in the emitter-to-collector circuit of the first transistor, and a first variable resistor in the emitter circuit of the first transistor, (c) a firing circuit for said silicon controlled power rectifier, said firing circuit being arranged to be controlled by said input circuit and comprising a pulsating D.C. source, a second PNP transistor, the emitter-to-base of the second transistor being connected across said pulsating D.C. source, the emitter-to-collector circuit of the first transistor being connected across the emitter-to-base circuit of the second transistor so that the emitter-to-collector junction of the second transistor provides a variable resistance responsive to the signal input, a second capacitor connected for charging across the pulsating D.C. source in series with the emitter-to-collector circuit of the second transistor, a first double-based diode having its bases connected across the pulsating D.C. source and its emitter connected to the collector of the second transistor so that the first double-based diode and the second capacitor act as a relaxation oscillator discharging each time the charge on the second capacitor reaches the peak point voltage of the first double-based diode, and a pulse transformer having a primary winding connected in series with the double bases and having a secondary winding connected to the control terminal of the silicon controlled power rectifier so that said oscillator will provide a firing pulse the phase of which is variable in response to the variation in the signal impressed by the input circuit on the firing circuit, (d) said pulsating D.C. source comprising a pulsating D.C. synchronizing voltage that leads the A.C. power voltage by a fixed amount between about 10° and about 30°, (e) an overcurrent sensing circuit comprising means responsive to the output current from the silicon controlled power rectifier, and a Schmitt trigger having its input connected to said responsive means, and (f) a disarming circuit for the firing circuit, said disarming circuit comprising a third capacitor connected to the output of the Schmitt trigger so as to have intermittently applied thereto the pulse outputs of said trigger, means to supply a smooth D.C. voltage, a second double-based diode having its bases connected across the smooth D.C. voltage and its emitter connected to the third capacitor so as to go into a negative resistance state when the third capacitor is charged by the Schmitt trigger to the peak point voltage of the second double-based diode, said peak point voltage being such that it is attained upon the presence of an overcurrent condition in the output current from the silicon controlled power rectifier, a silicon controlled control rectifier connected across the second capacitor with its control terminal connected to one of the bases of the second double-based diode, the anode-to-cathode circuit of the silicon controlled control rectifier being connected across the smooth D.C. voltage so that upon the occurrence of an overcurrent condition in the output current from the silicon controlled power rectifier the silicon controlled control rectifier will short the second capacitor so as to disarm the firing circuit and will maintain the short so long as said D.C. voltage is supplied.

5. In combination with an A.C. power unit including a controlled rectifier having a control terminal and power terminals adapted to be connected in series with an incandescent lighting load between two sides of an A.C. power line, a firing circuit for said rectifier, said firing circuit comprising means for supplying an A.C. voltage in step with the A.C. voltage of the power line, means including a capacitor to which the in-step A.C. voltage is applied for shifting the phase of the A.C. voltage supplied so as to provide a pulsating D.C. voltage in synchronization with the A.C. power voltage and leading the A.C. power voltage by a small fixed amount between about 10° to about 30°, a variable phase shifting means having a power input, a signal input and an output the phase of which is variable in response to variation in the magnitude of the signal input, means connecting the power input of the variable phase shifting means to the leading pulsating D.C. voltage, the signal input of the variable phase shifting means being arranged to be connected to an external signal source and constituting an input voltage of controllable magnitude, and means connecting the output of the variable phase shifting means to the control terminal of the rectifier, whereby the magnitude of the input signal voltage determines lamp brilliance.

6. A combination as set forth in claim 5 wherein the variable phase shifting means is a pulse forming double-based diode relaxation oscillator including a rectifying bridge having an input and an output, the input being connected to the leading A.C. voltage, a PNP transistor having its emitter-to-base circuit connected to the output of the rectifying bridge and to the signal input so that the emitter-to-collector junction of said transistor provides a variable resistance responsive to the signal input, a capacitor connected for charging across the output of the rectifying bridge in series with the emitter-to-collector circuit of the transistor, a double-based diode having its bases connected across the output of the rectifying bridge and its emitter connected to the collector of the transistor so that the double-based diode and the capacitor act as a relaxation oscillator discharging each time the charge on the capacitor reaches the peak point voltage of the double-based diode, and a pulse transformer having a primary winding connected in series with the double bases and a secondary winding connected to the control terminal of the controlled rectifier so that the oscillator will provide a firing pulse the phase of which is variable in response to the variation in magnitude of the signal applied to the transistor.

7. In combination with an A.C. power unit including a silicon controlled rectifier having a control terminal and power terminals adapted to be connected in series with an incandescent lamp load between the two sides of an A.C. power line, a firing circuit for said silicon controlled rectifier, said firing circuit including a variable phase shifting means having a power input, a signal input and an output the phase of which is variable in response to variation of signal input, said signal input being adapted to be connected to an external signal source constituting an input voltage of variable magnitude, means applying a pulsating D.C. voltage in synchronization with the A.C. power voltage to said power input, a capacitor connected to be responsive to said signal input and having a charging path to absorb energy from the pulsating D.C. voltage upon an increase in signal input, said capacitor having a low resistance discharge path, means responsive to the signal input upon a decrease thereof for allowing said capacitor to discharge through the low resistance discharge path, said capacitor being connected in the firing circuit to vary the degree of phase shift so that the firing circuit has a time-on constant which is longer than the time-off constant thereof, and means connecting the output of the variable phase shifting means to the control terminal of the silicon controlled rectifier whereby the magnitude of the input voltage determines lamp brilliance.

8. A combination as set forth in claim 7 wherein the charging path for the capacitor includes a transistor with the capacitor connected in the emitter-to-collector circuit thereof, signal input terminals, an impedance connected across the signal input terminals, said impedance being connected in the base-to-collector circuit of the transistor, the signal at the signal input terminals developing a voltage across the impedance that reverse biases the base-to-collector junction of the transistor so that said transistor functions as an emitter follower.

9. In combination with an A.C. power unit including a controlled rectifier having a control terminal and power terminals adapted to be connected in series with an incandescent lamp load between the two sides of an A.C. power line, a firing circuit for said rectifier, said firing circuit comprising a variable phase shifting means having a power input, a signal input and an output the phase of which is variable in response to variation of input signal, means applying an A.C. voltage in synchronization with the A.C. power voltage to said power input, an external signal input terminal for application thereto of an input voltage of variable magnitude, means connecting said external signal input terminal to the signal input of the phase shifting means so that the magnitude of the input voltage determines lamp brilliance, a feed-back circuit including a transformer having a primary winding arranged to be connected across the load and a secondary winding, means connecting the secondary winding to the signal input terminal to apply a feed-back voltage to said signal input terminal, means connecting the output of the variable phase shifting means to the control terminal of the rectifier, and a filter in the feed-back circuit, said filter including a rectifying network with an input and an output, said input being connected to the secondary winding of the transformer, and a capacitor and a variable resistor connected in series with one another and connected across the output of the rectifying network whereby said filter by varying the ripple content of the fed-back voltage controls the shape of the curve of R.M.S. voltage output of the A.C. power unit versus the magnitude of the signal input voltage.

10. In combination with a light dimming A.C. power unit including a silicon controlled rectifier having a control terminal and power terminals adapted to be connected in series with an incandescent lamp load between the two sides of an A.C. power line, a firing circuit for said rectifier, said firing circuit comprising means for supplying a pulsating D.C. voltage in synchronism with A.C. voltage of the power line, a variable phase shifting means having a power input, a signal input and an output the phase of which is variable in response to variation in the magnitude of the signal input, means connecting the power input of the variable phase shifting means to the pulsating D.C. voltage, the signal input of the variable phase shifting means being arranged to be connected to an external signal source comprising an input voltage of controllable magnitude and means connecting the output of the variable phase shifting means to the input terminal of the rectifier, whereby the magnitude of the input voltage determines lamp brilliance, and a saturating filter reactor with a closed iron core having a soft hysteresis loop and with a winding of less than fifty turns, said saturating filter reactor being series connected with the power terminals of the silicon controlled rectifier and constructed and arranged to have a high initial impedance so as to limit during and immediately after the firing of said silicon controlled rectifier the rate of current rise of said silicon controlled rectifier and to thereafter still possess considerable reluctance so as to reduce the rate of voltage and current rise in said silicon controlled rectifier, thus limiting the shock of fast rising current that would otherwise cause audible lamp filament noise and objectionable harmonics at radio frequencies.

11. In combination with an A.C. power unit including a silicon controlled rectifier having a control terminal adapted to be connected in series with an incandescent lamp load between the two sides of an A.C. power line, a firing circuit for said silicon controlled rectifier, said firing circuit comprising a phase shifting means which includes a relaxation oscillator having a capacitor, said relaxation oscillator periodically charging and discharging said capacitor several times in each half cycle of the line A.C. voltage, means responsive to the initial discharge of the capacitor in each half cycle for firing the silicon controlled rectifier, thermal means sensing the temperature of the silicon controlled rectifier, and means providing a circuit shorting the capacitor when the thermal means senses a temperature in excess of a predetermined temperature.

12. In combination with a light dimming A.C. power unit including a silicon controlled rectifier having a control terminal and power terminals adapted to be connected in series with an incandescent lamp load between the two sides of an A.C. power line, means to supply a pulsating D.C. voltage synchronized with the A.C. power line voltage, a firing circuit for said silicon controlled rectifier, said firing circuit including a variable phase shiftng means powered by said pulsating D.C. voltage and having a signal input and an output the phase of which is variable in response to the magnitude of the signal input, the signal input of the variable phase shifting means being arranged to be connected to an external signal source comprising a signal input voltage of variable magnitude, and means connecting the output of the variable phase shifting means to the control terminal of the silicon controlled rectifier to supply a firing voltage thereto, whereby the magnitude of the signal input voltage determines lamp brilliance, means sensing the flow of current through the incandescent lamp load and generating an overcurrent signal upon the occurrence of an overcurrent condition in the load and means responsive to an overcurrent signal for lowering the pulsating D.C. voltage to prevent the supplying of a firing voltage, said last-named means including a manually resettable lock-on cricuit to maintain the pulsating D.C. voltage lowered.

13. In combination with a light dimming A.C. power unit including a silicon controlled rectifier having a control terminal and power terminals adapted to be connected in series with an incandescent lamp load between two sides of an A.C. power line, means to supply a pulsating D.C. voltage synchronized with the A.C. power line voltage, a firing circuit for said silicon controlled rectifier, said firing circuit including a variable phase shiftng means powered by said pulsating D.C. voltage and having a signal input and an output the phase of which is variable in response to the magnitude of the signal input, the signal input of the variable phase shifting means being arranged to be connected to an external signal source comprising a signal input voltage of variable magnitude, and means connecting the output of the variable phase shifting means to the control terminal of the silicon controlled rectifier to supply a firing voltage thereto, whereby the magnitude of the signal input voltage determines lamp brilliance, means sensing the flow of current through the incandescent lamp load and generating an overcurrent signal upon the occurrence of an overcurrent condition in the load, and means responsive to an overcurrent signal for disarming the firing circuit to prevent the supplying of a firing voltage, said disarming means including a manually resettable lock-on circuit to maintain the firing circuit disarmed, said sensing means including a capacitor to absorb energy during the period of current in-rush to a cold incandescent lamp filament so as to prevent disarming of the firing circuit during such period and also including an inductance to store energy and render said means sensitive to overcurrent at less than full conduction angles.

14. In combination with a light dimming A.C. power unit including a silicon controlled power rectifier having a control terminal and power terminals adapted to be connected in series with an incandescent lamp load between two sides of an A.C. power line, a firing circuit for said rectifier, said firing circuit comprising means for applying an A.C. voltage in synchronism with the A.C. voltage of the power line, a variable phase shifting means including a relaxation oscillator having an intermittently charging and discharging first capacitor for generating pulses of a firing voltage, said variable phase shifting means having a power input, a signal input and an output the phase of which is variable in response to variations in the magnitude of the signal input, means connecting the power input of the variable phase shifting means to the synchronized A.C. voltage, the signal input of the variable phase shifting means being arranged to be connected to an external signal source comprising a signal input voltage of controllable magnitude, and means connecting the output of the variable phase shifting means to the control terminal of the rectifier to supply a firing voltage thereto, whereby the magnitude of the signal input voltage determines lamp brilliance, means sensing the flow of current through the load, a Schmitt trigger connected to said sensing means and generating an overcurrent signal upon the occurrence of an overcurrent condition in the load, and means responsive to an overcurrent signal for disarming the firing circuit to prevent the supplying of a firing voltage, said disarming means including a second capacitor connected to the output of the Schmitt trigger, means to supply a smooth D.C. voltage, a double-based diode having its bases connected across the smooth D.C. voltage and its emitter connected to the second capacitor so as to go into a negative resistance state when the second capacitor is charged by the Schmitt trigger to the peak point voltage of the double-based diode, said peak point voltage being such that it is attained upon the presence of an overcurrent condition in the output current from the silicon controlled power rectifier except for the in-rush current to a cold incandescent lamp load to which the sensing means is rendered insensitive by the second capacitor, a silicon controlled control rectifier connected across the first capacitor with its control terminal connected to one of the bases of the double-based diode, the anode-to-cathode circuit of the silicon controlled control rectifier being connected across the smooth D.C. voltage so that upon the occurrence of an overcurrent condition in the output current from the silicon controlled power rectifier the silicon controlled control rectifier will short the first capacitor so as to disarm the firing circuit, said disarming means further including a manually resettable lock-on circuit to maintain the firing circuit disarmed.

15. In combination with an A.C. power unit including a controlled rectifier having a control terminal and power terminals adapted to be connected in series with a lighting load between the two sides of an A.C. power line, a firing circuit for said rectifier, said firing circuit comprising external signal input terminals arranged to be connected to an external signal source comprising a signal input voltage of variable magnitude, an impedance connected across said input terminals, a first transistor, said impedance being connected in the base-to-collector circuit of said first transistor, the input signal developing a voltage across the impedance which reverse biases the base-to-collector junction of the first transistor so that the first transistor functions as an emitter follower, a pulsating D.C. source, a second transistor, the emitter-to-base circuit of the second transistor being connected across said pulsating D.C. source, the emitter-to-collector circuit of the first transistor being connected across the emitter-to-base circuit of the second transistor so that the emitter-to-collector junction of the second transistor provides a variable resistance responsive to the magnitude of the signal input, a capacitor connected across the emitter-to-collector of the first transistor to delay the response of the second transistor to an increase in the magnitude signal input, a manually variable resistor between the pulsating D.C. source and the emitter of the first transistor, said firing circuit further including a relaxation oscillator having a control terminal connected to the collector of the second transistor, the output from the relaxation oscillator being connected to the control terminal of the rectifier, the manually variable resistor being adjustable to set a minimum bias adjustment for the first transistor so as to prevent misfiring of the rectifier in the absence of a signal input.

References Cited by the Examiner
UNITED STATES PATENTS

| | | | |
|---|---|---|---|
| 2,920,240 | 1/1960 | Macklem | 315—312 |
| 2,954,509 | 9/1960 | Izenour | 315—197 |
| 3,056,905 | 10/1962 | Rosenfeld et al. | 317—40 |
| 3,120,620 | 2/1964 | Nowell | 307—88.5 |
| 3,128,396 | 4/1964 | Morgan | 307—88.5 |
| 3,130,347 | 4/1964 | Harpley | 307—88.5 |
| 3,142,781 | 7/1964 | Izenour | 315—194 |
| 3,146,392 | 8/1964 | Sylvan | 307—88.5 |

OTHER REFERENCES

G.E. Application Note, "The Silicon Controlled Rectifier in Lamp Dimming and Heating Control Service," by E. E. Von Zastrow, September 1961.

G.E.-SCR Manual, second edition, copyright by General Electric Co., 1961, pages 198–199, also pages 50, 51, 112–116 and 120–123 cited of interest.

JOHN W. HUCKERT, *Primary Examiner.*

JAMES D. KALLAM, *Examiner.*

A. M. LESNIAK, *Assistant Examiner.*